United States Patent [19]

Tanaka et al.

[11] Patent Number: 5,598,278
[45] Date of Patent: Jan. 28, 1997

[54] SYSTEM CONFIGURATION METHOD FOR AUDIO-VIDEO APPARATUS WITH DIGITAL BUS INTERFACE

[75] Inventors: Shigeo Tanaka, Tokyo; Hiroshi Yamazaki, Kanagawa; Noriko Kotabe, Chiba; Kouichi Sugiyama, Kanagawa; Makoto Sato, Kanagawa; Akira Katsuyama, Kanagawa; Yoshio Osakabe, Kanagawa; Yasuo Kusagaya, Tokyo, all of Japan

[73] Assignee: Sony Corporation, Tokyo, Japan

[21] Appl. No.: 278,954

[22] Filed: Jul. 22, 1994

[30] Foreign Application Priority Data

Jul. 30, 1993 [JP] Japan ..................... 5-188559

[51] Int. Cl.⁶ ................. H04N 5/91; H04N 7/10
[52] U.S. Cl. .............. 386/96; 348/8; 340/825.06; 386/46
[58] Field of Search ..................... 348/705, 706, 348/659, 571, 8; 340/825.06, 825.07, 825.25, 825.24, 825.72; 370/110.1; 358/341

[56] References Cited

U.S. PATENT DOCUMENTS

| | | | |
|---|---|---|---|
| 4,484,261 | 11/1984 | Brantingham | 354/200 |
| 4,837,627 | 6/1989 | Mengel | 358/191.1 |
| 4,989,081 | 1/1991 | Miyagawa et al. | 358/93 |
| 5,054,022 | 10/1991 | Van Steenbrug | 370/85.6 |
| 5,170,252 | 12/1992 | Gear et al. | 358/181 |
| 5,463,619 | 10/1995 | Van Steenbrugge et al. | 370/58.1 |
| 5,475,835 | 12/1995 | Hickey | 395/600 |

Primary Examiner—Thai Q. Tran
Assistant Examiner—David Vincent
Attorney, Agent, or Firm—William S. Frommer; Alvin Sinderbrand

[57] ABSTRACT

Connection patterns as many as possible can be managed by less standard patterns. Connected states of a VTR (30), a VTR (40), a VTR (50), a VTR (60), an MDP (70), a tuner (80) and an AV center (100) composing a standard pattern are memorized in advance. A flag (N) representing the non-use is set to an AV equipment (e.g., VTR (60)) that is not used in actual practice of the AV equipments constructing the standard pattern. Therefore, a system in which a part of the AV equipments constructing the standard pattern is omitted can be managed similarly to the system of the standard pattern.

10 Claims, 48 Drawing Sheets

FIG. 5

| SOURCE | | | DESTINATION | |
|---|---|---|---|---|
| VTR 60 | P1 | → | AV CENTER | P1 |
| TUNER | P1 | → | VTR 60 | P1 |
| VTR 40 | P1 | → | AV CENTER | P2 |
| MDP | P1 | → | VTR 40 | P1 |
| VTR 30 | P1 | → | AV CENTER | P3 |
| AV CENTER | P3 | → | VTR 30 | P1 |
| VTR 50 | P1 | → | VTR 30 | P2 |
| VTR 30 | P2 | → | VTR 50 | P1 |
| VTR 40 | P2 | → | VTR 30 | P3 |
| VTR 30 | P3 | → | VTR 40 | P2 |

FIG. 7

| SOURCE | | | DESTINATION | |
|---|---|---|---|---|
| VTR 60 | P1 | → | AV CENTER | P1 |
| TUNER | P1 | → | VTR 60 | P1 |
| VTR 40 | P1 | → | AV CENTER | P2 |
| MDP | P1 | → | VTR 40 | P1 |
| VTR 30 | P1 | → | AV CENTER | P3 |
| AV CENTER | P3 | → | VTR 30 | P1 |
| VTR 50 | P1 | → | VTR 30 | P2 |
| VTR 30 | P2 | → | VTR 50 | P1 |
| VTR 40 | P2 | → | VTR 60 | P2 |
| VTR 60 | P2 | → | VTR 40 | P2 |

FIG. 9

| EQUIPMENT U/N | SOURCE | | | EQUIPMENT U/N | DESTINATION | |
|---|---|---|---|---|---|---|
| N | VTR 60 | P1 | → | | AV CENTER | P1 |
| | TUNER | P1 | → | N | VTR 60 | P1 |
| | VTR 40 | P1 | → | | AV CENTER | P2 |
| | MDP | P1 | → | | VTR 40 | P1 |
| | VTR 30 | P1 | → | | AV CENTER | P3 |
| | AV CENTER | P3 | → | | VTR 30 | P1 |
| | VTR 50 | P1 | → | | VTR 30 | P2 |
| | VTR 30 | P2 | → | | VTR 50 | P1 |
| | VTR 40 | P2 | → | | VTR 30 | P3 |
| | VTR 30 | P3 | → | | VTR 40 | P2 |

FIG. 11

| EQUIPMENT U/N | SOURCE | | | EQUIPMENT U/N | DESTINATION | |
|---|---|---|---|---|---|---|
| | VTR 60 | P1 | → | | AV CENTER | P1 |
| | TUNER | P1 | → | | VTR 60 | P1 |
| | VTR 40 | P1 | → | | AV CENTER | P2 |
| | MDP | P1 | → | | VTR 40 | P1 |
| N | VTR 30 | P1 | → | | AV CENTER | P3 |
| | AV CENTER | P3 | → | N | VTR 30 | P1 |
| | VTR 50 | P1 | → | N | VTR 30 | P2 |
| N | VTR 30 | P2 | → | | VTR 50 | P1 |
| | VTR 40 | P2 | → | N | VTR 30 | P3 |
| N | VTR 30 | P3 | → | | VTR 40 | P2 |

FIG. 13

| EQUIPMENT U/N | SOURCE | | | EQUIPMENT U/N | DESTINATION | |
|---|---|---|---|---|---|---|
| | VTR 60 | P1 | → | | AV CENTER | P1 |
| | TUNER | P1 | → | | VTR 60 | P1 |
| N | VTR 40 | P1 | → | | AV CENTER | P2 |
| | MDP | P1 | → | N | VTR 40 | P1 |
| | VTR 30 | P1 | → | | AV CENTER | P3 |
| | AV CENTER | P3 | → | | VTR 30 | P1 |
| | VTR 50 | P1 | → | | VTR 30 | P2 |
| | VTR 30 | P2 | → | | VTR 50 | P1 |
| N | VTR 40 | P2 | → | | VTR 30 | P3 |
| | VTR 30 | P3 | → | N | VTR 40 | P2 |

FIG. 15

| EQUIPMENT U/N | SOURCE | | | EQUIPMENT U/N | DESTINATION | |
|---|---|---|---|---|---|---|
| | VTR 60 | P1 | → | | AV CENTER | P1 |
| N | TUNER | P1 | → | | VTR 60 | P1 |
| | VTR 40 | P1 | → | | AV CENTER | P2 |
| | MDP | P1 | → | | VTR 40 | P1 |
| | VTR 30 | P1 | → | | AV CENTER | P3 |
| | AV CENTER | P3 | → | | VTR 30 | P1 |
| | VTR 50 | P1 | → | | VTR 30 | P2 |
| | VTR 30 | P2 | → | | VTR 50 | P1 |
| | VTR 40 | P2 | → | | VTR 30 | P3 |
| | VTR 30 | P3 | → | | VTR 40 | P2 |

FIG. 17

| EQUIPMENT U/N | SOURCE | | | EQUIPMENT U/N | DESTINATION | |
|---|---|---|---|---|---|---|
| | VTR 60 | P1 | → | | AV CENTER | P1 |
| | TUNER | P1 | → | | VTR 60 | P1 |
| | VTR 40 | P1 | → | | AV CENTER | P2 |
| N | MDP | P1 | → | | VTR 40 | P1 |
| | VTR 30 | P1 | → | | AV CENTER | P3 |
| | AV CENTER | P3 | → | | VTR 30 | P1 |
| | VTR 50 | P1 | → | | VTR 30 | P2 |
| | VTR 30 | P2 | → | | VTR 50 | P1 |
| | VTR 40 | P2 | → | | VTR 30 | P3 |
| | VTR 30 | P3 | → | | VTR 40 | P2 |

FIG. 19

| EQUIPMENT U/N | SOURCE | | | EQUIPMENT U/N | DESTINATION | |
|---|---|---|---|---|---|---|
| | VTR 60 | P1 | → | | AV CENTER | P1 |
| | TUNER | P1 | → | | VTR 60 | P1 |
| | VTR 40 | P1 | → | | AV CENTER | P2 |
| | MDP | P1 | → | | VTR 40 | P1 |
| | VTR 30 | P1 | → | | AV CENTER | P3 |
| | AV CENTER | P3 | → | | VTR 30 | P1 |
| N | VTR 50 | P1 | → | | VTR 30 | P2 |
| | VTR 30 | P2 | → | N | VTR 50 | P1 |
| | VTR 40 | P2 | → | | VTR 30 | P3 |
| | VTR 30 | P3 | → | | VTR 40 | P2 |

FIG. 21

| EQUIPMENT U/N | SOURCE | | | EQUIPMENT U/N | DESTINATION | |
|---|---|---|---|---|---|---|
|   | VTR 60 | P1 | → |   | AV CENTER | P1 |
| N | TUNER  | P1 | → |   | VTR 60    | P1 |
|   | VTR 40 | P1 | → |   | AV CENTER | P2 |
| N | MDP    | P1 | → |   | VTR 40    | P1 |
|   | VTR 30 | P1 | → |   | AV CENTER | P3 |
|   | AV CENTER | P3 | → |   | VTR 30 | P1 |
|   | VTR 50 | P1 | → |   | VTR 30    | P2 |
|   | VTR 30 | P2 | → |   | VTR 50    | P1 |
|   | VTR 40 | P2 | → |   | VTR 30    | P3 |
|   | VTR 30 | P3 | → |   | VTR 40    | P2 |

FIG. 23

| EQUIPMENT U/N | SOURCE | | | EQUIPMENT U/N | DESTINATION | |
|---|---|---|---|---|---|---|
|   | VTR 60 | P1 | → |   | AV CENTER | P1 |
| N | TUNER  | P1 | → |   | VTR 60    | P1 |
|   | VTR 40 | P1 | → |   | AV CENTER | P2 |
|   | MDP    | P1 | → |   | VTR 40    | P1 |
|   | VTR 30 | P1 | → |   | AV CENTER | P3 |
|   | AV CENTER | P3 | → |   | VTR 30 | P1 |
| N | VTR 50 | P1 | → |   | VTR 30    | P2 |
|   | VTR 30 | P2 | → | N | VTR 50    | P1 |
|   | VTR 40 | P2 | → |   | VTR 30    | P3 |
|   | VTR 30 | P3 | → |   | VTR 40    | P2 |

FIG. 25

| EQUIPMENT U/N | SOURCE | | | EQUIPMENT U/N | DESTINATION | |
|---|---|---|---|---|---|---|
| | VTR 60 | P1 | → | | AV CENTER | P1 |
| | TUNER | P1 | → | | VTR 60 | P1 |
| | VTR 40 | P1 | → | | AV CENTER | P2 |
| N | MDP | P1 | → | | VTR 40 | P1 |
| | VTR 30 | P1 | → | | AV CENTER | P3 |
| | AV CENTER | P3 | → | | VTR 30 | P1 |
| N | VTR 50 | P1 | → | | VTR 30 | P2 |
| | VTR 30 | P2 | → | N | VTR 50 | P1 |
| | VTR 40 | P2 | → | | VTR 30 | P3 |
| | VTR 30 | P3 | → | | VTR 40 | P2 |

FIG. 27

| EQUIPMENT U/N | SOURCE | | | EQUIPMENT U/N | DESTINATION | |
|---|---|---|---|---|---|---|
| | VTR 60 | P1 | → | | AV CENTER | P1 |
| N | TUNER | P1 | → | | VTR 60 | P1 |
| | VTR 40 | P1 | → | | AV CENTER | P2 |
| N | MDP | P1 | → | | VTR 40 | P1 |
| | VTR 30 | P1 | → | | AV CENTER | P3 |
| | AV CENTER | P3 | → | | VTR 30 | P1 |
| N | VTR 50 | P1 | → | | VTR 30 | P2 |
| | VTR 30 | P2 | → | N | VTR 50 | P1 |
| | VTR 40 | P2 | → | | VTR 30 | P3 |
| | VTR 30 | P3 | → | | VTR 40 | P2 |

FIG. 29

| EQUIPMENT U/N | SOURCE | | | EQUIPMENT U/N | DESTINATION | |
|---|---|---|---|---|---|---|
| N | VTR 60 | P1 | → | | AV CENTER | P1 |
| | TUNER | P1 | → | N | VTR 60 | P1 |
| | VTR 40 | P1 | → | | AV CENTER | P2 |
| N | MDP | P1 | → | | VTR 40 | P1 |
| | VTR 30 | P1 | → | | AV CENTER | P3 |
| | AV CENTER | P3 | → | | VTR 30 | P1 |
| N | VTR 50 | P1 | → | | VTR 30 | P2 |
| | VTR 30 | P2 | → | N | VTR 50 | P1 |
| | VTR 40 | P2 | → | | VTR 30 | P3 |
| | VTR 30 | P3 | → | | VTR 40 | P2 |

FIG. 31

| EQUIPMENT U/N | SOURCE | | | EQUIPMENT U/N | DESTINATION | |
|---|---|---|---|---|---|---|
| | VTR 60 | P1 | → | | AV CENTER | P1 |
| N | TUNER | P1 | → | | VTR 60 | P1 |
| N | VTR 40 | P1 | → | | AV CENTER | P2 |
| | MDP | P1 | → | N | VTR 40 | P1 |
| | VTR 30 | P1 | → | | AV CENTER | P3 |
| | AV CENTER | P3 | → | | VTR 30 | P1 |
| N | VTR 50 | P1 | → | | VTR 30 | P2 |
| | VTR 30 | P2 | → | N | VTR 50 | P1 |
| N | VTR 40 | P2 | → | | VTR 30 | P3 |
| | VTR 30 | P3 | → | N | VTR 40 | P2 |

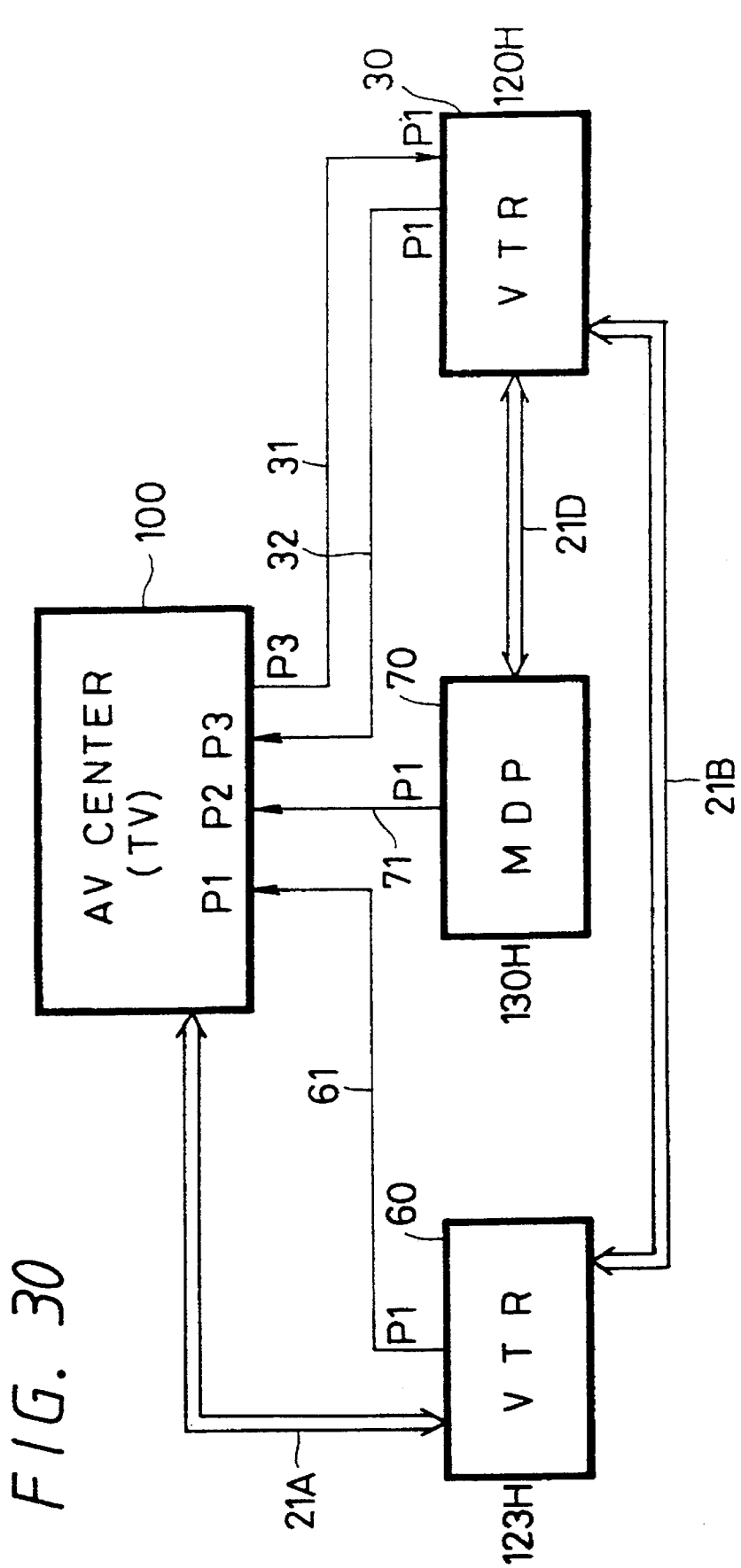

FIG. 32

| EQUIPMENT U/N SOURCE | | | EQUIPMENT U/N DESTINATION | | PATH U/N |
|---|---|---|---|---|---|
| VTR 60 | P1 | → | AV CENTER | P1 | |
| TUNER | P1 | → | VTR 60 | P1 | |
| VTR 40 | P1 | → | AV CENTER | P2 | |
| MDP | P1 | → | VTR 40 | P1 | |
| VTR 30 | P1 | → | AV CENTER | P3 | |
| AV CENTER | P3 | → | VTR 30 | P1 | |
| VTR 50 | P1 | → | VTR 30 | P2 | |
| VTR 30 | P2 | → | VTR 50 | P1 | |
| VTR 40 | P2 | → | VTR 30 | P3 | |
| VTR 30 | P3 | → | VTR 40 | P2 | |
| VTR 40 | P2 | → | VTR 60 | P2 | N |
| VTR 60 | P2 | → | VTR 40 | P2 | N |

FIG. 33

| EQUIPMENT U/N | SOURCE | | EQUIPMENT U/N | DESTINATION | | PATH U/N |
|---|---|---|---|---|---|---|
| VTR60 | P1 | → | AV CENTER | P1 | |
| TUNER | P1 | → | VTR60 | P1 | |
| VTR40 | P1 | → | AV CENTER | P2 | |
| MDP | P1 | → | VTR40 | P1 | |
| VTR30 | P1 | → | AV CENTER | P3 | |
| AV CENTER | P3 | → | VTR30 | P1 | |
| VTR50 | P1 | → | VTR30 | P2 | |
| VTR30 | P2 | → | VTR50 | P1 | |
| VTR40 | P2 | → | VTR30 | P3 | N |
| VTR30 | P3 | → | VTR40 | P2 | N |
| VTR40 | P2 | → | VTR60 | P2 | |
| VTR60 | P2 | → | VTR40 | P2 | |

FIG. 35

| EQUIPMENT U/N | SOURCE | | EQUIPMENT U/N | DESTINATION | | PATH U/N |
|---|---|---|---|---|---|---|
| VTR 60 | P1 | → | AV CENTER | P1 | | |
| TUNER | P1 | → | VTR 60 | P1 | | |
| VTR 40 | P1 | → | AV CENTER | P2 | | |
| MDP | P1 | → | VTR 40 | P1 | | |
| VTR 30 | P1 | → | AV CENTER | P3 | | |
| AV CENTER | P3 | → | VTR 30 | P1 | | |
| VTR 50 | P1 | → | VTR 30 | P2 | | |
| VTR 30 | P2 | → | VTR 50 | P1 | | |
| VTR 40 | P2 | → | VTR 30 | P3 | N |
| VTR 30 | P3 | → | VTR 40 | P2 | N |
| VTR 40 | P2 | → | VTR 60 | P2 | N |
| VTR 60 | P2 | → | VTR 40 | P2 | N |

SYSTEM CONFIGURATION METHOD FOR AUDIO-VIDEO APPARATUS WITH DIGITAL BUS INTERFACE

BACKGROUND OF THE INVENTION

The present invention relates to an audio-video system control method for use in controlling an audio-video system composed of a plurality of audio-video equipments.

In an audio-video (referred to hereinafter as "AV" for simplicity) system, a VTR (video tape recorder), an MDP (multi-disc player), a television (TV) receiver, a speaker, etc., are connected to form a system. When a video disc is played back by the MDP, for example, and a reproduced signal from the video disc is supplied to the VTR so that the reproduced signal is recorded on a magnetic tape or the reproduced signal is output to and displayed by the television receiver, if an MDP playback command is issued, then the VTR and the television receiver are automatically energized to implement predetermined operations. Therefore, the user need not control respective AV equipments separately and the AV equipments become easier to handle.

When the respective AV equipments in the AV system are controlled, it is customary that a predetermined AV equipment (e.g., television receiver) is used as an AV center to manage the connected states of the respective AV equipments constructing the AV system and the AV equipments are controlled by the AV center.

The AV center uses a memory to memorize in advance data representing the AV equipments forming the AV system and the connected states of the AV equipments in order to manage the respective AV equipments and controls the AV equipments in accordance with the memorized data.

However, inasmuch as the AV system memorizes in advance the standard pattern of the AV system and connects the AV equipments in accordance with the standard pattern in actual practice, if the AV system are connected with a pattern different from the standard pattern, there is then the problem that the respective AV equipments cannot be controlled functionally.

To solve this problem, it is proposed that the AV system memorizes in advance standard patterns as many as possible. This proposal causes another problem because the storage capacity of the memory for memorizing standard patterns is increased as the number of the standard patterns is increased. As a result, the AV system becomes expensive.

SUMMARY OF THE INVENTION

In view of the aforesaid aspect, it is an object of the present invention to provide an AV system control method in which connection patterns as many as possible can be managed without increasing the memory capacity.

According to an aspect of the present invention, there is provided an audio-video system control method in which predetermined connected states between an audio-video center and a plurality of audio-video equipments are previously memorized in a table as standard patterns and the audio-video equipments are controlled in response to the standard patterns memorized in the table. This method comprises the steps of adding the table with a code representing whether or not the audio-video equipment included in the standard pattern is actually used in a system and controlling the audio-video equipments in response to information of the audio-video equipment on the table added with said code.

In accordance with a second aspect of the present invention, there is provided an audio-video system control method in which predetermined connected states between an audio-video center and a plurality of audio-video equipments are previously memorized in a table as standard patterns and the audio-video equipments are controlled in response to the standard patterns memorized in the table. This method comprises the steps of adding the table with a code representing whether or not a connection path of the audio-video equipment included in the standard pattern is actually realized, and controlling the audio-video equipments in response to information of the audio-video equipment on the table added with the code.

BRIEF DESCRIPTION OF THE DRAWINGS

FIG. 5 is a diagram used to explain standard pattern data of the AV system shown in FIG. 4;

FIG. 7 is a diagram used to explain standard pattern data of the AV system shown in FIG. 6;

FIG. 9 is a diagram used to explain standard pattern data of the AV system shown in FIG. 8;

FIG. 11 is a diagram used to explain standard pattern data of the AV system shown in FIG. 10;

FIG. 13 is a diagram used to explain standard pattern data of the AV system shown in FIG. 12;

FIG. 15 is a diagram used to explain standard pattern data of the AV system shown in FIG. 14;

FIG. 17 is a diagram used to explain standard pattern data of the AV system shown in FIG. 16;

FIG. 19 is a diagram used to explain standard pattern data of the AV system shown in FIG. 18;

FIG. 21 is a diagram used to explain standard pattern data of the AV system shown in FIG. 20;

FIG. 23 is a diagram used to explain standard pattern data of the AV system shown in FIG. 22;

FIG. 25 is a diagram used to explain standard pattern data of the AV system shown in FIG. 24;

FIG. 27 is a diagram used to explain standard pattern data of the AV system shown in FIG. 26;

FIG. 29 is a diagram used to explain standard pattern data of the AV system shown in FIG. 28;

FIG. 30 is a block diagram showing an example of an arrangement of an AV system;

FIG. 31 is a diagram used to explain standard pattern data of the AV system shown in FIG. 30;

FIG. 32 is a diagram used to explain standard pattern data of the AV system shown in FIG. 4;

FIG. 33 is a diagram used to explain standard pattern data of the AV system shown in FIG. 6;

FIG. 35 is a diagram used to explain standard pattern data of the AV system shown in FIG. 34;

DETAILED DESCRIPTION OF THE PREFERRED EMBODIMENTS

The present invention will now be described in detail with reference to the drawings.

Figure 1:
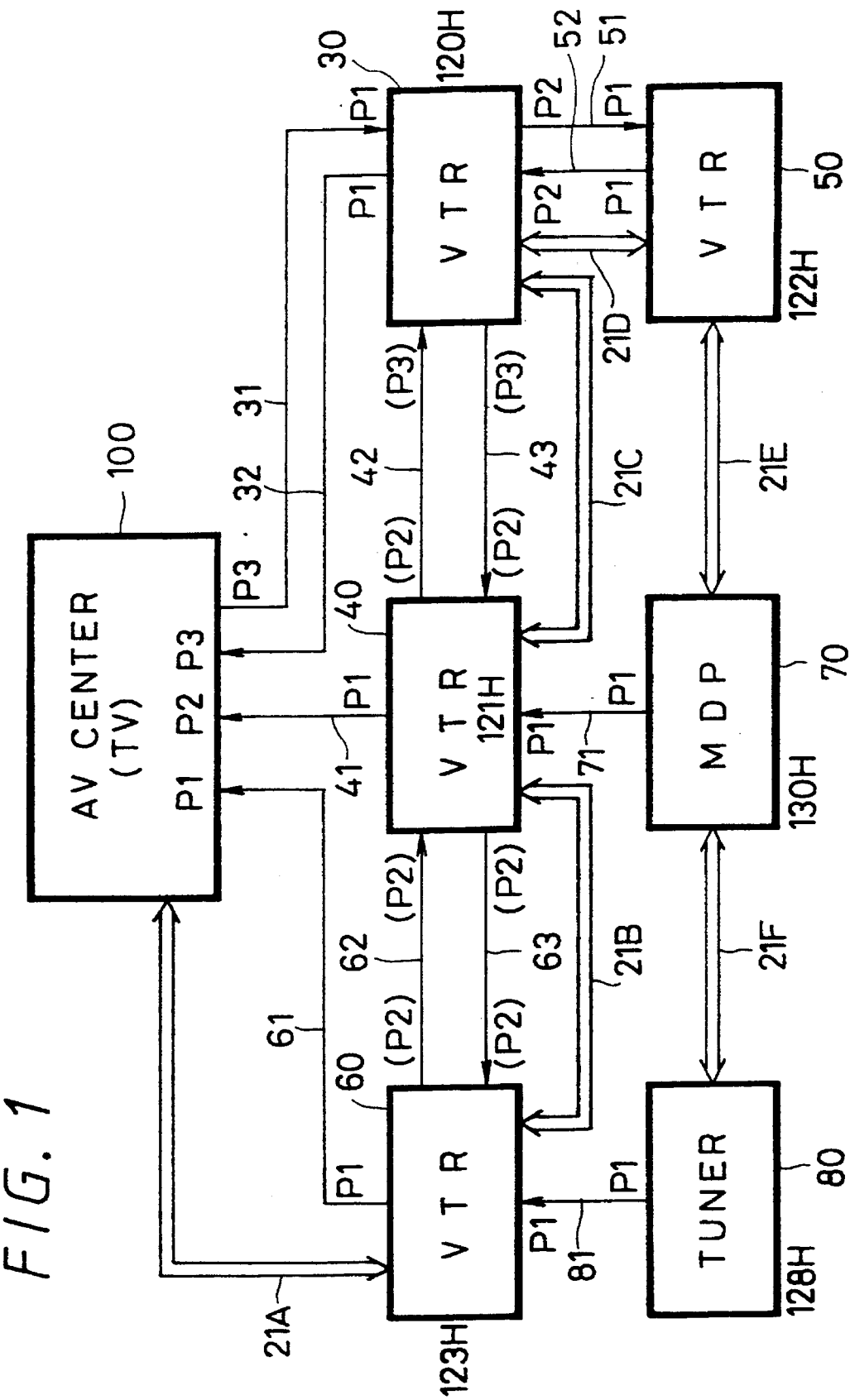
FIG. 1 is a block diagram showing an arrangement of an AV system to which an AV system control method according to the present invention is applied.

FIG. 1 of the accompanying drawings shows in block form an arrangement of an AV system to which an AV system control method according to an embodiment of the present invention is applied. According to this embodiment, as shown in FIG. 1, the AV system comprises a television receiver 100 serving as an AV center, four VTRs 30, 40, 50, 60, an MDP 70 and a tuner 80.

The AV center (e.g., television receiver) 100 and the VTR 60; the VTR 60 and the VTR 40; the VTR 40 and the VTR 30; the VTR 30 and the VTR 50; the VTR 50 and the MDP 70; and the MDP 70 and the tuner 80 are connected together by means of control buses (AV buses) 21A through 21F, respectively. Although the order of the connections shown in FIG. 1 may be changed, it is necessary that all AV equipments are connected sequentially.

According to this embodiment, an output of the tuner 80 is supplied to an input plug P1 of the VTR 60 from a plug P1 through an AV signal line 81. An output plug P1 of the VTR 60 is connected through an AV signal line 61 to an input plug P1 of the AV center 100. An output plug P1 of the MDP 70 which can reproduce some suitable recording media, such as a video disc and a compact disc, is connected through an AV signal line 71 to an input plug P1 of the VTR 40. An output plug P1 of the VTR 40 is connected through the AV signal line 41 to an input plug P2 of the AV center 100.

An output plug P3 of the AV center 100 is connected through an AV signal line 31 to an input plug P1 of the VTR 30. An output plug P1 of the VTR 30 is connected through an AV signal line 32 to an input plug P3 of the AV center 100. An output plug P2 of the VTR 30 is connected to an input plug P1 of the VTR 50 through an AV signal line 51. An output plug P1 of the VTR 50 is connected to an input plug P2 of the VTR 30 through an AV signal line 52.

When the VTR 30 and the VTR 40 are connected to each other, the output plug P2 of the VTR 40 is connected through an AV signal line 42 to an input plug P3 of the VTR 30. An output plug P3 of the VTR 30 is connected through an AV signal line 43 to the input plug P2 of the VTR 40.

When the VTR 40 and the VTR 60 are connected to each other, the output plug P2 of the VTR 60 is connected through an AV signal line 62 to the input plug P2 of the VTR 40. The output plug P2 of the VTR 40 is connected through an AV signal line 63 to the input plug P2 of the VTR 60.

When the VTR 30 and the VTR 40 are connected, the VTR 40 and the VTR 60 cannot be connected. Conversely, when the VTR 40 and the VTR 60 are connected, the VTR 30 and the VTR 40 cannot be connected, i.e., only one of the VTR pairs can be connected.

The connected states of these AV equipments are illustrated more in detail on the following tables 1 through 13.

TABLE 1

| AV center 100 (1**) | | | |
|---|---|---|---|
| plug number | signal | direction | connection destination A connection destination |
| P1 | A/V | IN | VTR60 P1 |
| P2 | A/V | OUT | VTR40 P1 |
| P3 | A/V | IN/OUT | VTR30 P1 |

AV center generally includes monitor, PIP, amplifier, video tuner, switch box and user I/O (OSD) as incorporated subdevices.

TABLE 2

| Switch box arrangement of AV center 100 | | | | |
|---|---|---|---|---|
| switch | signal | input selection | output destination | note |
| SW1 | A/V | P1, P2, P3, tuner SD | monitor, sub-device, PIP, Q3 output | P1, P2, P3, tuner operated in a ganged relation with AV equipments |

TABLE 3

| VTR 30 (120 H) | | | |
|---|---|---|---|
| plug number | signal | direction | connection destination A connection destination V |
| AV center P3 | P1 | A/V | IN/OUT |
|  | P2 | A/V | IN/OUT |

TABLE 3-continued

VTR 30 (120 H)

| plug number | signal | direction | connection destination A connection destination V |
|---|---|---|---|
| VTR50 P1 VTR40 P2 | P3 | A/V | IN/OUT |

The VTR generally includes video tape deck, video tuner and switch box as incorporatedc sub-devices.

TABLE 4

Switch box arrangement of VTR 30

| switch | signal | input selection | output destination | note |
|---|---|---|---|---|
| SW1 | A/V | P1, P2, P3, tuner SD, deck SD | Q1, Q2, Q3 deck SD | outputs P1, P2, P3, deck are operated in a ganged relation & also operated in a ganged relation with AV equipments |

TABLE 5

VTR 40 (121 H)

| plug number | signal | direction | connection destination A connection destination V |
|---|---|---|---|
| P1 | A/V | IN | MDP P1 |
| P1 | A/V | OUT | AV center P2 |
| P2 | A/V | IN/OUT | VTR30 P3 |

The VTR generally includes video tape deck, video tuner and switch box as incorporated sub-devices.

TABLE 6

Switch box arrangement of VTR 40

| switch | signal | input selection | output destination | note |
|---|---|---|---|---|
| SW1 | A/V | P1, P2, P3, tuner SD, deck SD | Q1, Q2, Q3, deck SD | outputs P3, deck are operated in a ganged relation and also operated in a ganged relation with AV equipments |

TABLE 7

VTR 50 (121 H)

| plug number | signal | direction | connection destination A connection destination V |
|---|---|---|---|
| P1 | A/V | IN/OUT | VTR30 P2 |

The VTR generally includes video tape deck, video tuner and switch box as incorporated sub-devices.

TABLE 8

Switch box arrangement of VTR 50

| switch | signal | input selection | output destination | note |
|---|---|---|---|---|
| SW1 | A/V | P1, P2, P3 tuner SD deck SD | Q1, Q2, Q3 deck SD | outputs P1, P2, P3, deck are operated in a ganged relation & also operated in a ganged relation with AV equipments |

TABLE 9

VTR 60 (123 H)

| plug number | signal | direction | connection destination A connection destination V |
|---|---|---|---|
| P1 | A/V | IN | TUNER P1 |
| P2 | A/V | OUT | AV center P1 |

The VTR generally includes video tape deck, video tuner and switch box as incorporated sub-devices.

TABLE 10

Switch box arrangement of VTR 60

| switch | signal | input selection | output destination | note |
|---|---|---|---|---|
| SW1 | A/V | P1, P2, P3, tuner SD, deck SD | Q1, Q2, Q3, deck SD | outputs P1, P2, P3, deck are operated in a ganged relation & also operated in a ganged relation with AV equipments |

TABLE 11

MDP (130 H)

| plug number | signal | direction | connection destination A connection destination V |
|---|---|---|---|
| P1 | A/V | OUT | VTR40 P1 |

The MDP generally includes video disc player and switch box a incorporated sub-devices.
Switch box arrangement
Output of video disc player is supplied to P1 plug.

TABLE 12

Tuner 80 (128 H)

| plug number | signal | direction | connection destination A connection destination V |
|---|---|---|---|
| P1 | A/V | OUT | VTR60 P1 |

The TUNER generally includes video tuner 1, video tuner 2, switch box as incorporated sub-devices.

TABLE 13

Switch box arrangement of tuner 80

| switch | signal | input selection | output destination | note |
|---|---|---|---|---|
| SW1 | A/V | tuner 1 SD tuner 2 SD | Q1 | tuner is operated in a ganged relation with AV equipments |

These tables 1 through 13 will be described below in brief. The table 1, for example, shows the connected states of the respective plugs of the AV center 100. The plug 1 is an input (IN) plug to which there is transmitted an audio or video signal (A/V). The connection destination of the plug P1 is the plug P1 of the VTR 60. The plug P2 is an input (IN) plug to which the audio or video signal is transmitted, similarly to the plug P1 and is connected to the plug P1 of the VTR 40.

The plug P3 is a plug to which an audio or video signal is transmitted. There are two plugs P3 for input and output (IN/OUT). The connection destination of the plug P3 is the plug P1 of the VTR 30.

The table 2 shows the arrangement of the switch box incorporated in the AV center 100. The switch SW1 in the switch box is used to transmit an audio or video signal and selects any one of the plugs P1, P2, P3 or the tuner SD incorporated in the AV center 100. Reference symbol SD depicts a sub-device and represents the incorporated device. The output destination of the switch SW1 is a monitor sub-device (CRT 13 of FIG. 2 which will be described later on), the terminal PIP and the terminal Q3 (monitor output). Incidentally, the plugs P1, P2, P3 and the tuner SD incorporated in the AV center 100 are changed-over in an interlocking fashion. Moreover, the plugs P1, P2, P3 and the tuner SD are changed-over in a ganged relation with (in synchronism with) the audio and video signals. A message representing that "P1, P2, P3, tuner and also operated in a ganged relation to AV equipments" on the note of the table 2 means that "only the video signal is input to the CRT" and that "only the audio signal is input to the speaker".

As shown on the table 4, for example, in the switch box of the VTR 30, an output of the deck SD incorporated in the VTR 30 is output in a ganged relation to the plugs P1, P2, P3, i.e., the same signal is output to the plugs P1, P2, P3 so that the output signals cannot be switched independently. A message "in a ganged relation to one another" in "deck is operated in a ganged relation to one another" is different from ". . . also operated in a ganged relation to AV equipments" means that "when the plugs P1, P2, P3 are IN, the deck is OUT" and "when the plugs P1, P2, P3 are OUT, the deck is IN". That is, the recording operation and the playback operation can be carried out.

Figure 2:
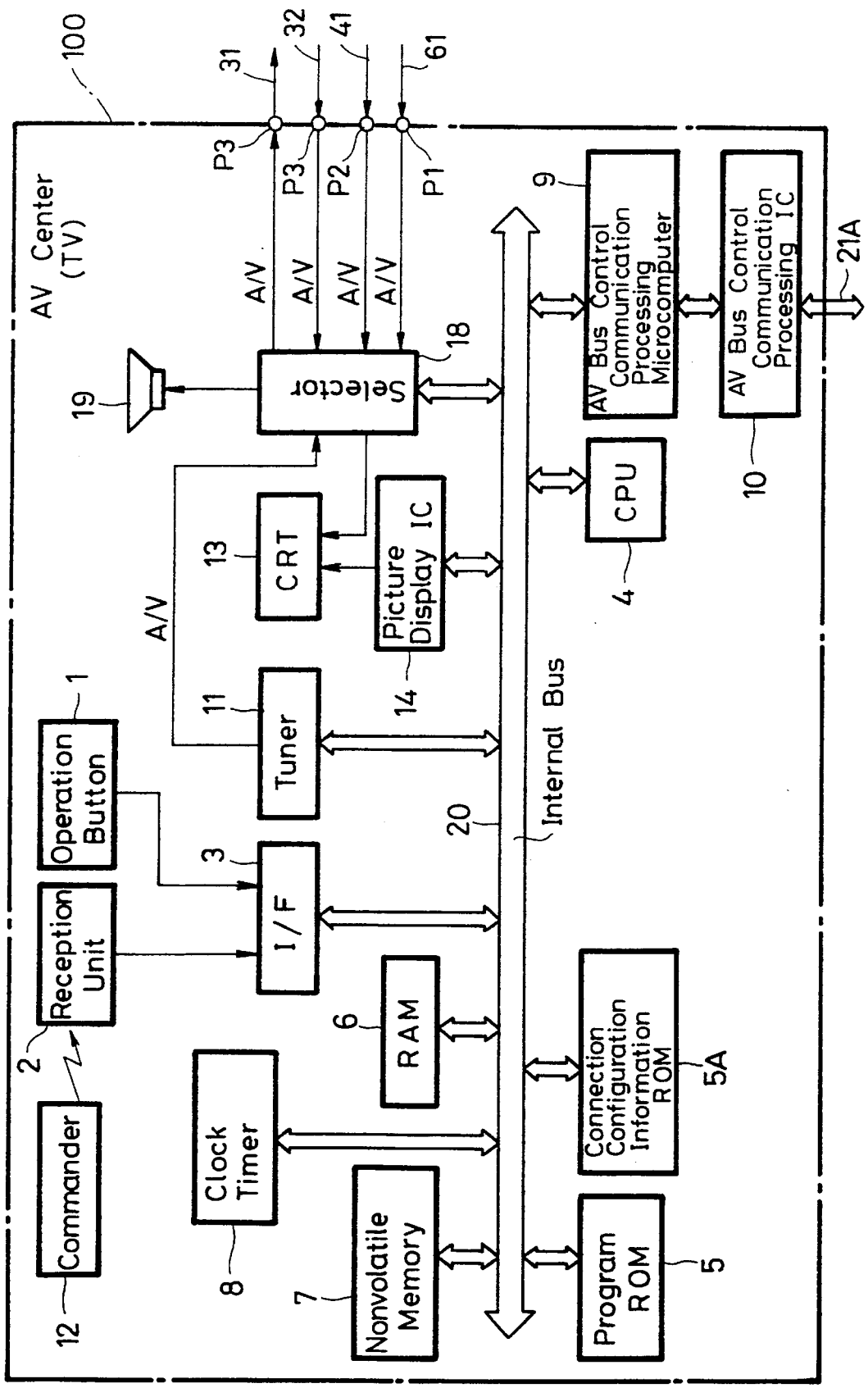
FIG. 2 is a block diagram showing an example of an arrangement of an AV center 100 shown in FIG. 1.

FIG. 2 shows an example of an arrangement of the AV center 100. As shown in FIG. 2, when an operation button 1 is operated, a predetermined signal is input to an interface (I/F) 3. When a commander 12 is operated, an infrared signal emitted from the commander 12 is received by a reception unit 2 and a signal is input to the interface 3. The interface 3 supplies these signals through an internal bus 20 to a CPU (central processing unit) 4. The CPU 4 controls respective portions of the AV center 100 in accordance with a program stored in a program ROM (read-only memory) 5.

Figure 3:
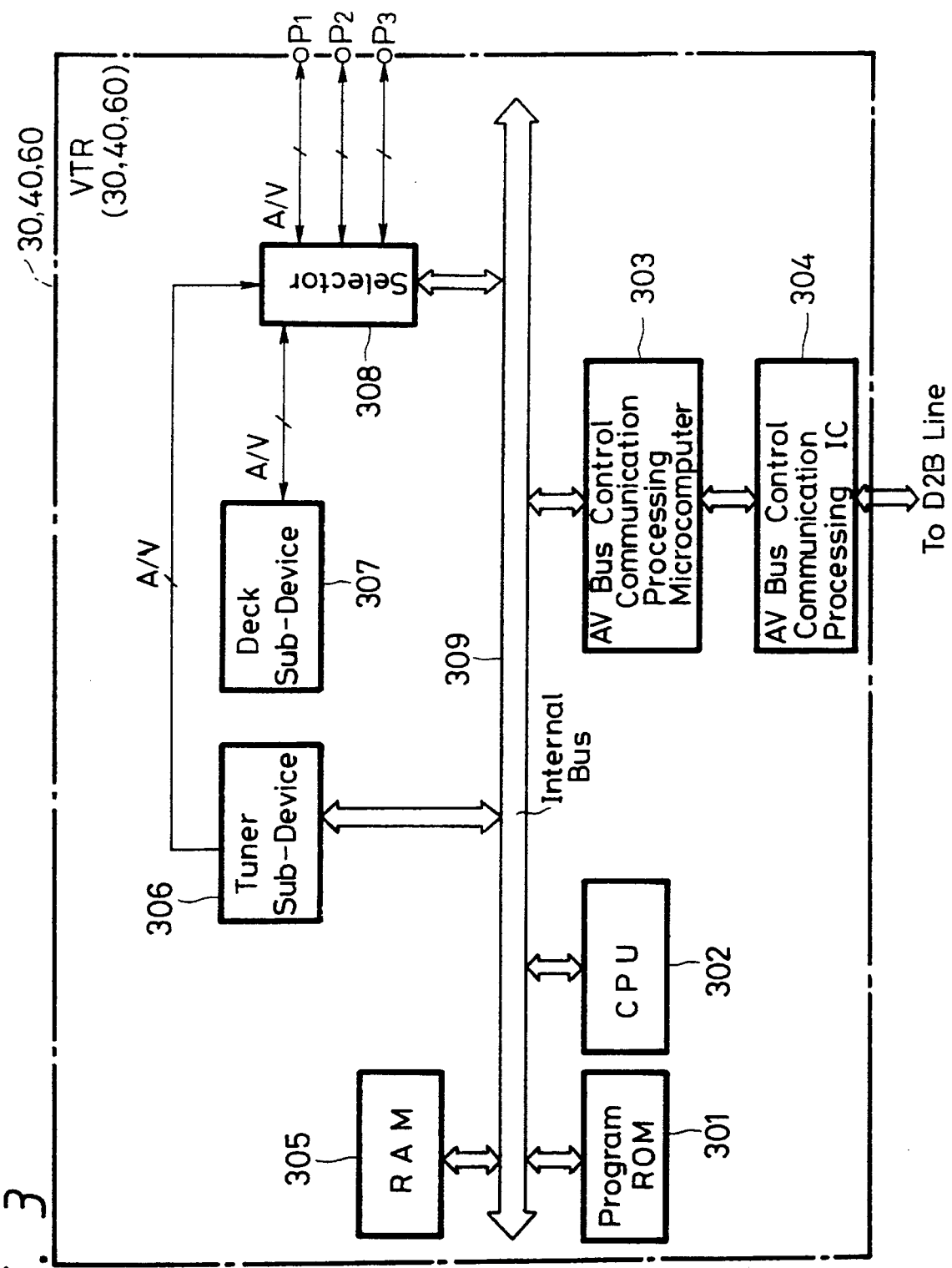
FIG. 3 is a block diagram showing an example of an arrangement of VTRs 30, 40, 60 shown in FIG. 1.

Data representing AV system standard patterns are memorized in a connection configuration information ROM 5A in advance. The user selects a predetermined one from the standard patterns memorized in the ROM 5A when the AV center 100 is in use. A connection pattern is formed of predetermined AV equipments and connection lines connecting AV equipments as shown in FIG. 3, for example.

Referring back to FIG. 2, a RAM (random access memory) 6 memorizes at any time data required when the CPU 4 executes a variety of processings. In this case, data that should be held even when AV center 100 is disabled is stored in a nonvolatile memory 7. The nonvolatile memory 7 memorizes information representing the status of equipment in use and information representing the status of connection line (path) in use, which will be described later on, in response to the table stored in the connection configuration information ROM 5A.

A clock timer 8 constantly counts time and outputs clock information. An AV bus control communication processor microcomputer 9 transmits and receives various commands, such as a recording command, a playback command, a channel setting command or the like between it and an electronic equipment (e.g., VTR 60 in this embodiment) connected to the control bus 21A through an AV bus control communication processor IC 10 to cause respective AV equipments to execute operation corresponding to a command supplied thereto.

A selector 18 is connected to the plugs P1 to P3 so that it outputs a video signal of the signals supplied thereto from the plugs P1 to P3 to a CRT (cathode ray tube) 13 which then displays a picture based on this video signal. Moreover, the selector 18 outputs an audio signal to a speaker 19 which then emanates a sound. A picture display IC 14 generates a video signal corresponding to OSD data supplied thereto from the CPU 4 to the CRT 13 which then displays a predetermined message and other images.

A tuner 11 receives a predetermined broadcast wave or the like and outputs a received signal to the selector 18. The selector 18 outputs an input signal through the output plug P3 to the VTR 30. FIG. 3 shows an example of an arrangement of the VTRs 30, 40, 60. Operations in respective blocks in FIG. 3 are similar to those of the corresponding blocks in the AV center 100 and therefore need not be described in detail.

A method of controlling respective AV equipments in the AV system will be described below. In the case of the embodiment shown in FIG. 1, the AV center 100 is a center to control other AV equipments. The connection configuration information ROM 5A memorizes in advance AV equipments shown in FIG. 4 and standard pattern data representing the connected states of the AV equipments as tables. The user selects a desired one of the tables stored in the connection configuration information ROM 5A when the AV system is in use.

As shown in FIG. 2, the CPU 4 outputs OSD data to the picture display IC 14 through the internal bus 20 in order to display a selected standard pattern. The picture display IC 14 generates image data corresponding to the standard pattern in response to the OSD data supplied thereto and outputs the same to the CRT 13 which then displays an image. Therefore, a standard pattern shown in FIG. 4 (or FIG. 5) which will be described later on, is displayed on the picture screen of the CRT 13. The user connects electronic equipments forming the AV system in response to the displayed standard pattern.

When the user selects a standard pattern, if there exists a standard pattern of the same AV system as the AV system composed of AV equipments which are combined (used) in actual practice, the user selects such standard pattern. If the same standard pattern is not available, the user selects a standard pattern wider (larger) than the AV system that the user intends to construct.

Figure 4:
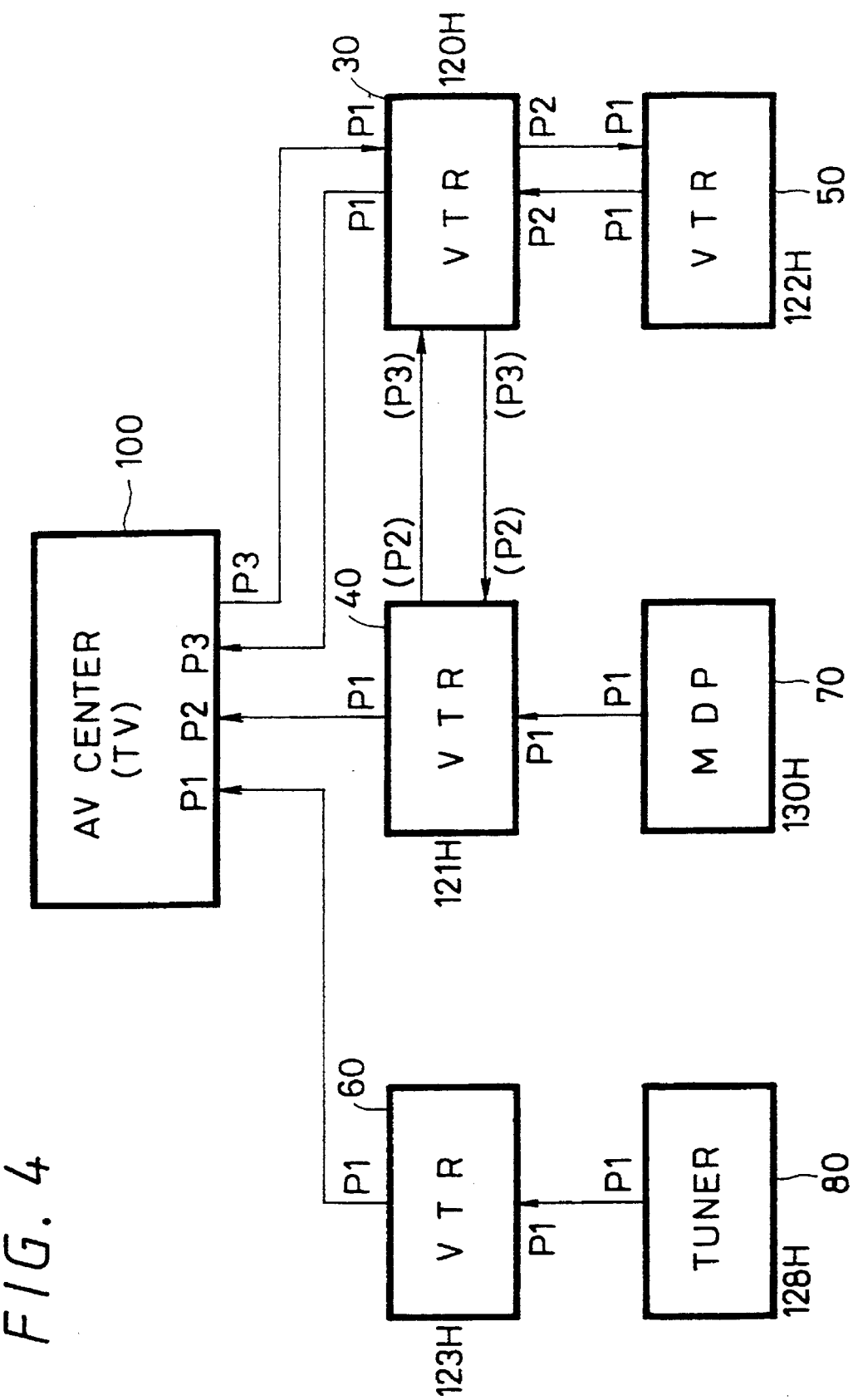
FIG. 4 is a block diagram showing an example of an arrangement of an AV system.
Figure 6:
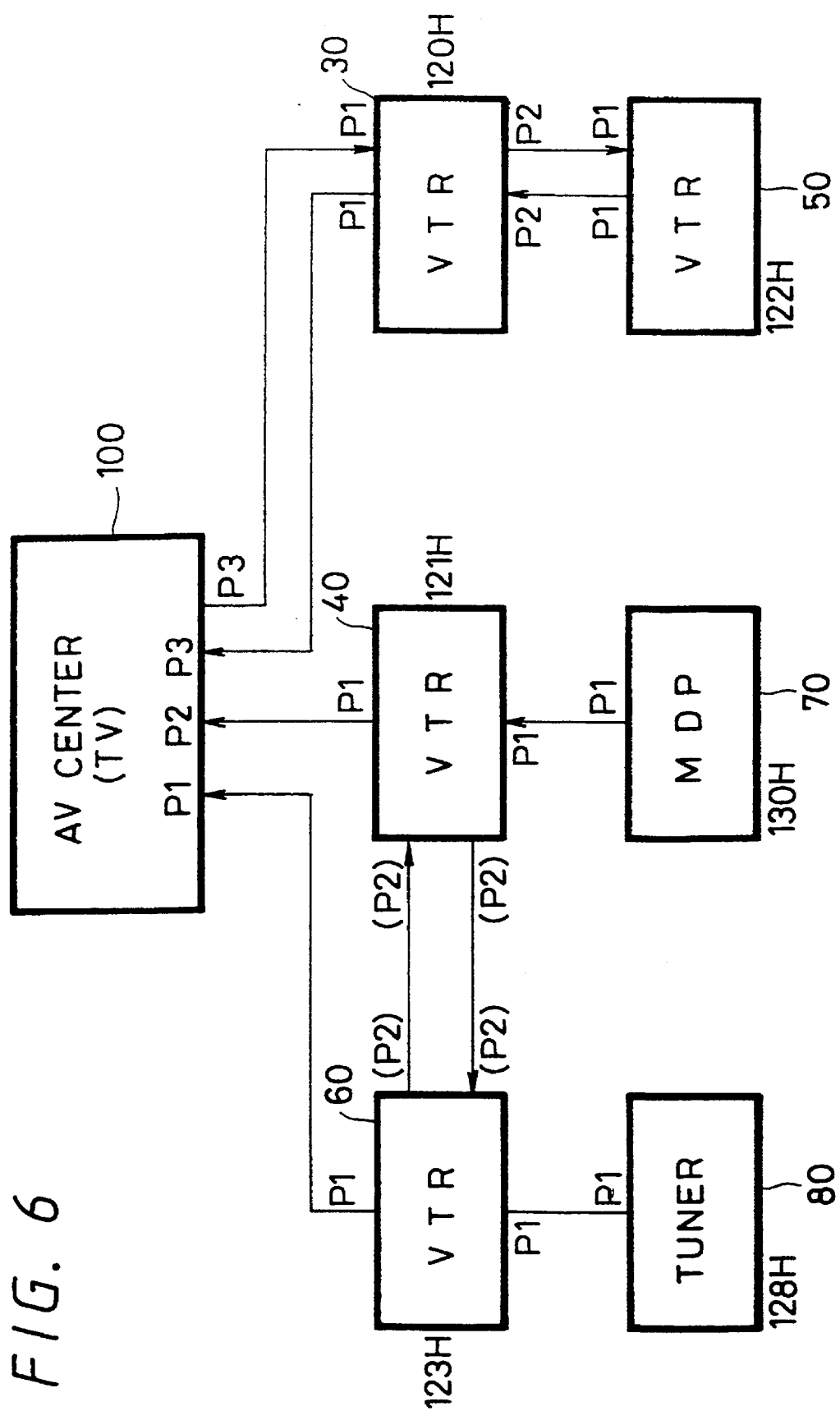
FIG. 6 is a block diagram showing an example of an arrangement of an AV system.

Let it now be assumed that a pattern shown in FIG. 4 or 6 is prepared as the standard pattern of the AV system composed of the AV center 100, the four VTRs 30 through 60, the MDP 70 and the tuner 80. FIG. 4 shows a pattern used when the VTR 30 and the VTR 40 are connected. FIG. 6 shows a pattern used when the VTR 40 and the VTR 60 are connected. FIGS. 5 and 7 show data corresponding to the standard patterns shown in FIGS. 4 and 6 and which are memorized in the connection configuration information ROM 5A.

Figure 8:
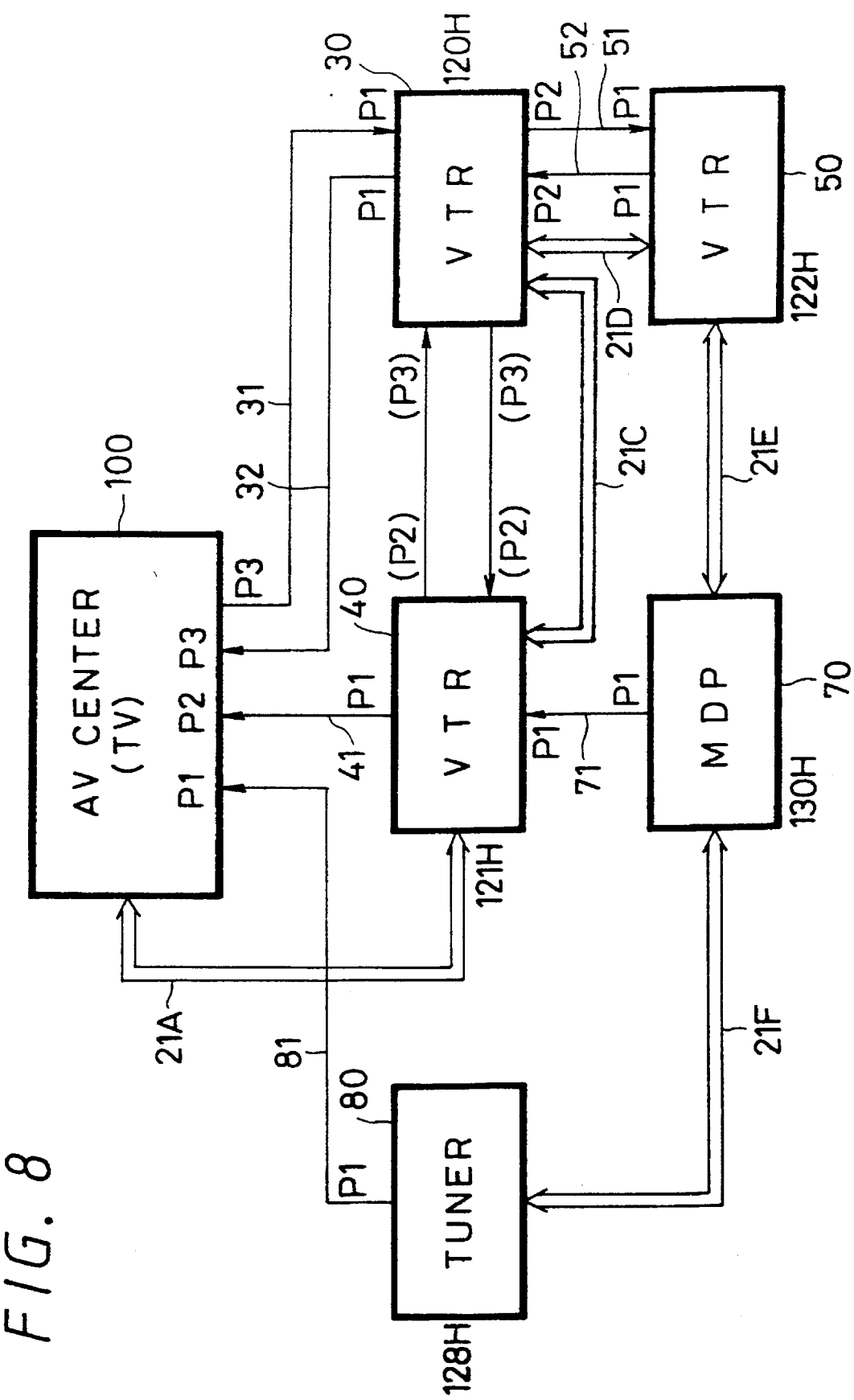
FIG. 8 is a block diagram showing an example of an arrangement of an AV system.

In this state, as shown in FIG. 8, for example, when the AV system is composed of an AV center 100, three VTRs 30, 40, 50 (one VTR is removed from the standard pattern), an MDP 70 and a tuner 80 and the VTR 30 and the VTR 40 are connected, the standard pattern shown in FIG. 4 (FIG. 5) is used.

When the standard pattern shown in FIGS. 4 and 5 is selected wherein the VTR 60 is removed and the tuner 80 is directly connected to the AV center 100 as shown in FIG. 8, for example, the user issues a command representing the removal of the VTR 60 to the CPU 4 by operating the operation button 1 or the commander 12. At that time, the CPU 4 causes the nonvolatile memory 7 to memorize information corresponding to the table as shown in FIG. 9.

Specifically, in this case, as information representing whether or not the AV equipment is actually used, an equipment flag U/N is added to the table. A flag N is set to an equipment (AV equipment which is not yet used) which is not yet adopted as an equipment constructing the AV system in actual practice. Then, the CPU 4 executes on the basis of the flag N a similar control effected when the AV system shown in FIG. 4 is controlled.

In the AV system arranged as shown in FIG. 8, when the user operates a predetermined switch (not shown) of the tuner 80 in order to output and display a signal received by the tuner 80 on the CRT 13 of the AV center 100, the tuner 80 generates a signal line connection request command to the AV center 100. This request command is supplied through the control bus (AV bus) 21 (21F, 21E, 21D, 21C, 21A) to the AV bus control communication processing IC 10 of the AV center 100.

The AV bus control communication processing IC 10 decodes an input request command and outputs the request command thus decoded to the AV bus control communication processing microcomputer 9. The AV bus control communication microcomputer 9 reads out the output path of the tuner 80 from the table shown in FIG. 9 memorized in the connection configuration information ROM 5A. The table shown in FIG. 9 describes the state that the output plug P1 of the tuner 80 is connected to the input plug P1 of the VTR 60 and that the output plug P1 of the VTR 60 is connected to the plug P1 of the AV center 100.

The CPU 4 determines on the basis of the data stored in the nonvolatile memory 7 whether or not the VTR 60 supplied with the output of the tuner 80 is used in actual practice. In the case of this embodiment, the flag N representing the non-use state is set to the VTR 60 and thus the CPU 4 can determine that the VTR 60 is not in use actually.

At that time, because the VTR 60 is not connected, the CPU 4 executes the control under the assumption that the plug P1 of the tuner 80 is directly connected to the plug P1 of the AV center 100. Specifically, the CPU 4 issues a command to the AV bus control communication processing microcomputer 9 so that the output of the tuner 80 is output from the plug P1. This command is supplied to the tuner 80 from the AV bus control communication processing IC through the control bus (AV bus) 21.

Each of the AV equipments including the tuner 80 incorporates a CPU, an AV bus control communication processing microcomputer and an AV bus control communication processing IC similarly to the case of the AV center 100. The AV bus control communication processing IC of the tuner 80 decodes the command supplied thereto and supplies the command thus decoded to the AV bus control communication processing microcomputer. The AV bus control communication processing microcomputer outputs this command to the CPU. When receiving this command, the CPU of the tuner 80 controls internal circuits such that a signal received at the incorporated circuit is output from the plug P1.

The CPU 4 of the AV center 100 outputs a command to the tuner 80 as described above and also controls the incorporated selector 18 so that a signal input thereto from the plug P3 is output to the CRT 13. As a result, the video signal and the audio signal output from the tuner 80 are supplied to the selector 18 of the AV center 100 through the output plug P1 of the tuner 80, the AV signal line 81 and the input plug P1 of the AV center 100. The selector 18 selects the video signal from the signals input thereto and outputs the selected video signal to the CRT 13 which then display an image. Also, the selector 18 supplies the audio signal to the speaker 19 from which it is emanated as sounds.

As described above, by adding the processing for confirming the equipment use flag, it becomes possible to manage a narrow pattern included in the standard pattern as a kind of standard patterns.

Figure 10:
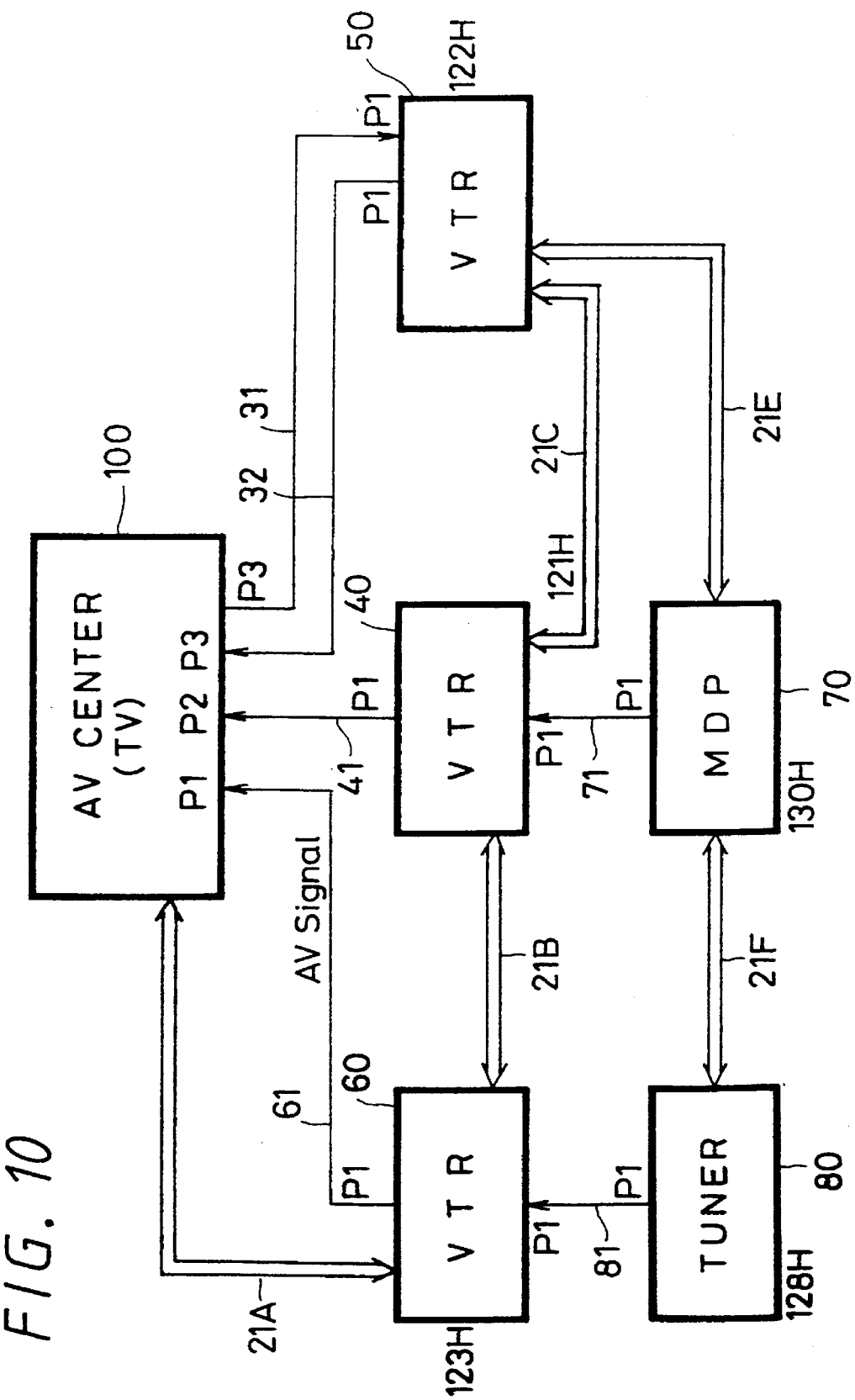
FIG. 10 is a block diagram showing an example of an arrangement of an AV system.

FIG. 10 shows other embodiment of the AV system. In this embodiment, the VTR 30 is removed from the AV system. In the case of this embodiment, the flag N representing the non-use state is set to the VTR 30. While the output plug P3 of the AV center 100 is connected to the input plug P1 of the VTR 30 and the output plug P2 of the VTR 30 is connected to the input plug P1 of the VTR 50 as seen in the standard pattern, the processing is carried out on the assumption that the plug P3 of the AV center 100 is directly connected to the plug P1 of the VTR 50 because the VTR 30 is not in use actually.

While the output plug P1 of the VTR 50 is connected to the input plug P2 of the VTR 30 and the output plug P1 of the VTR 30 is connected to the input plug P3 of the AV center 100 as seen in the standard pattern, in actual practice, the processing is carried out on the assumption that the output plug P1 of the VTR 50 is directly connected to the input plug P3 of the AV center 100.

In the case of this embodiment, because the VTR 30 is removed from the AV system, the output of the VTR 40 cannot directly be supplied to the VTR 50 or the output of the VTR 50 cannot directly be supplied to the VTR 40. When supplied with a command for supplying the output of the VTR 50 to the VTR 40 or supplying the output of the VTR 40 to the VTR 50, the AV center 100 controls respective units such that these signals are transmitted and received by means of the AV center 100.

Figure 12:
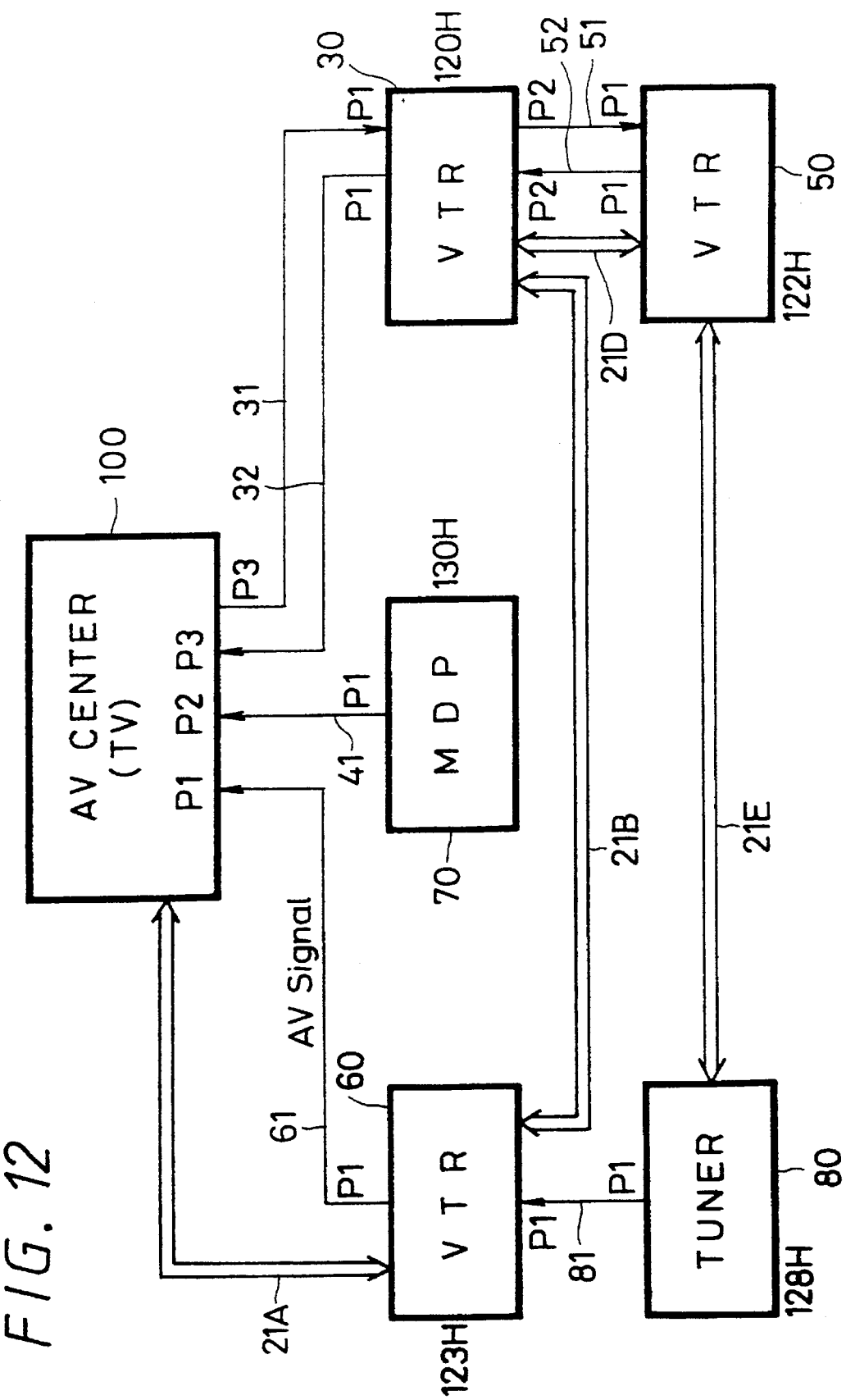
FIG. 12 is a block diagram showing an example of an arrangement of an AV system.

FIG. 12 shows other embodiment of the AV system from which the VTR 40 is removed. Accordingly, in this case, as shown in FIG. 13, the flag N representing the non-use is set to the VTR 40.

Figure 14:
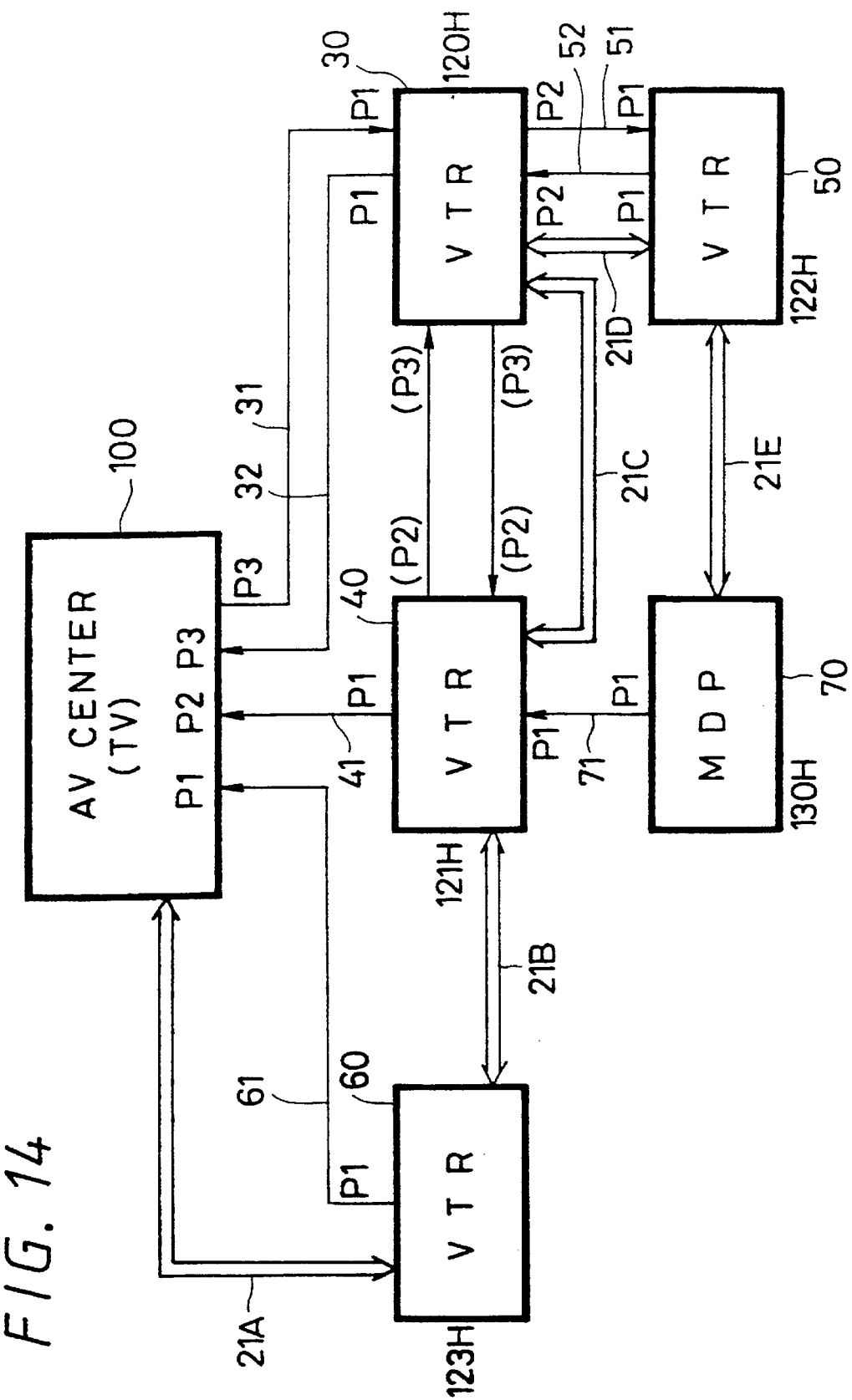
FIG. 14 is a block diagram showing an example of an arrangement of an AV system.

FIG. 14 shows other embodiment of the AV system from which the tuner 80 is removed. Accordingly, in this case, as shown in FIG. 15, the non-use flag N is set to the tuner 80.

Figure 16:
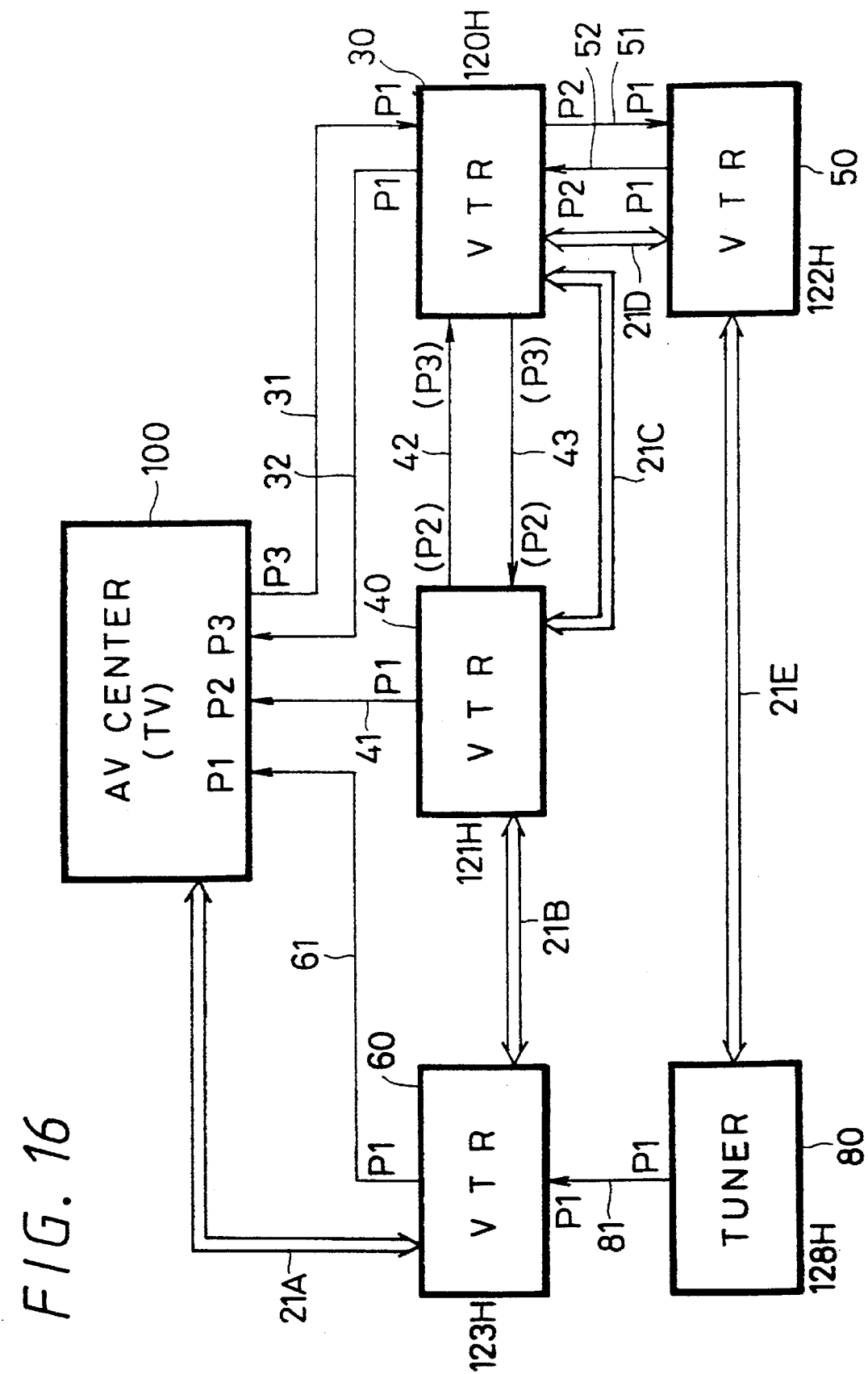
FIG. 16 is a block diagram showing an example of an arrangement of an AV system.

FIG. 16 shows other embodiment of the AV system from which the MDP 70 is omitted. Accordingly, in this case, as shown in FIG. 17, the non-use flag N is set to the MDP 70.

Figure 18:
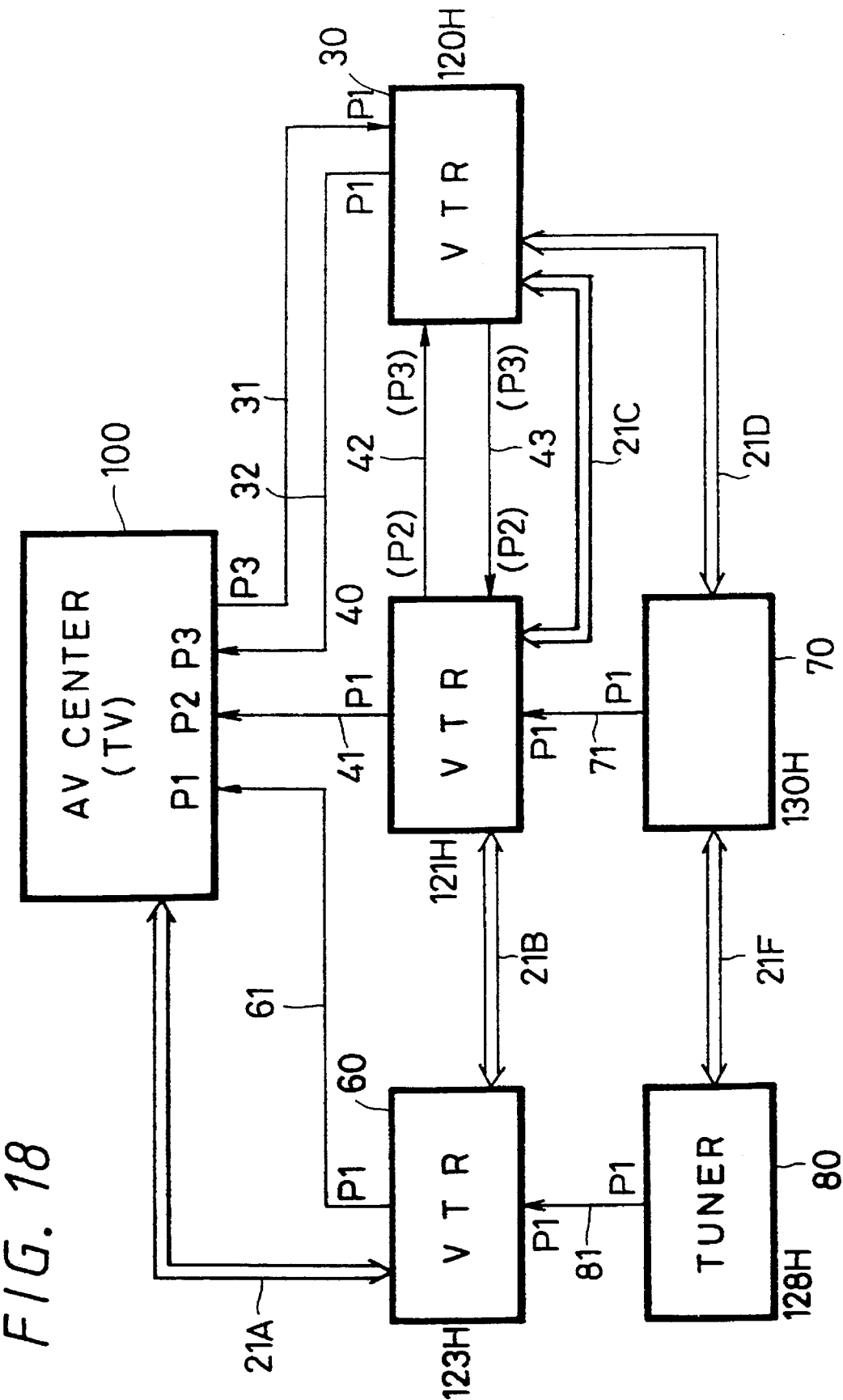
FIG. 18 is a block diagram showing an example of an arrangement of an AV system.

FIG. 18 shows other embodiment of the AV system from which the VTR 50 is omitted. Accordingly, in this case, as shown in FIG. 19, the non-use flag N is set to the VTR 50.

Figure 20:
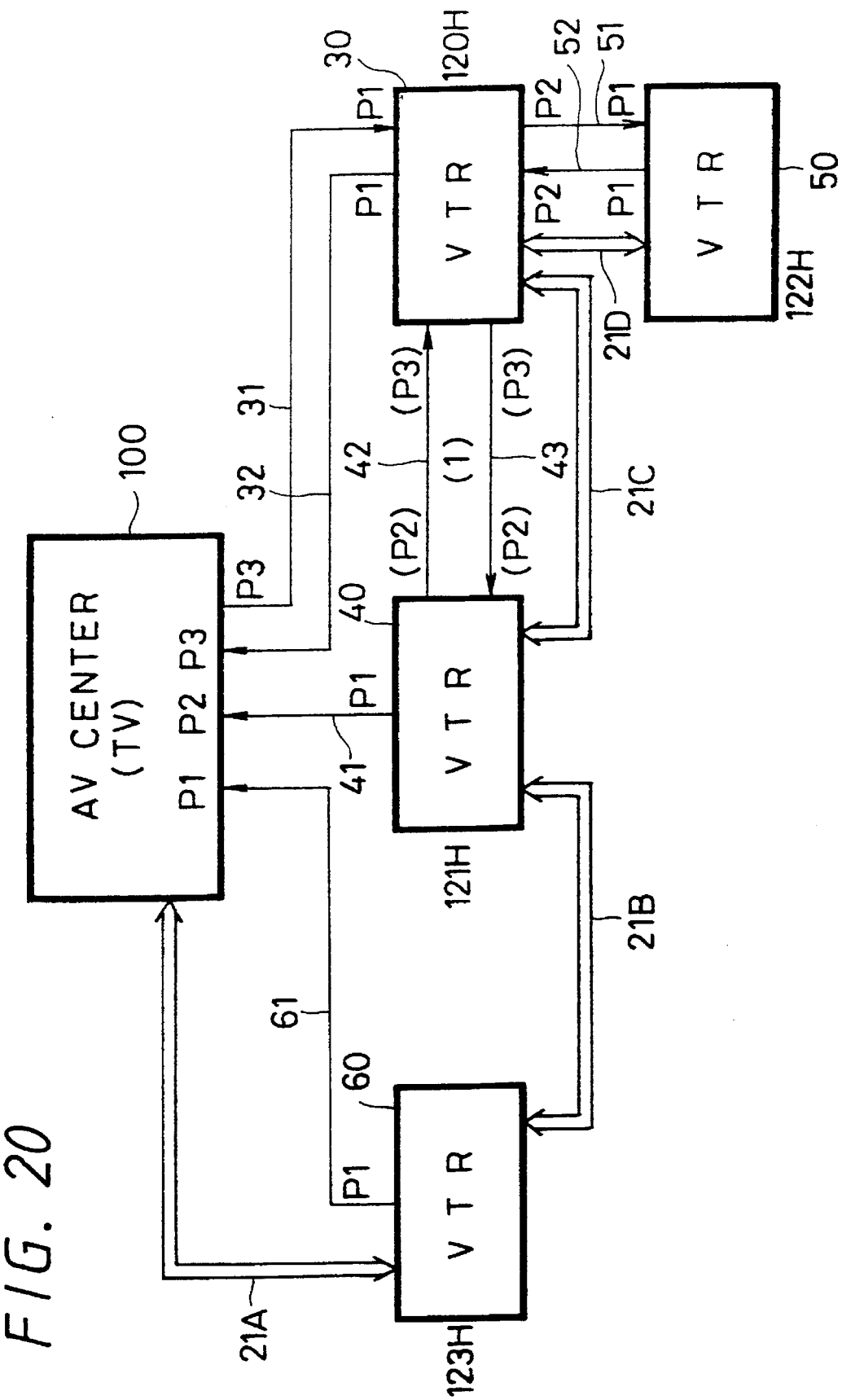
FIG. 20 is a block diagram showing an example of an arrangement of an AV system.

FIG. 20 shows other embodiment of the AV system from which the MDP 70 and the tuner 80 are omitted. Accordingly, as shown in FIG. 21, the non-use flag N are set to the MDP 70 and the tuner 80.

Figure 22:
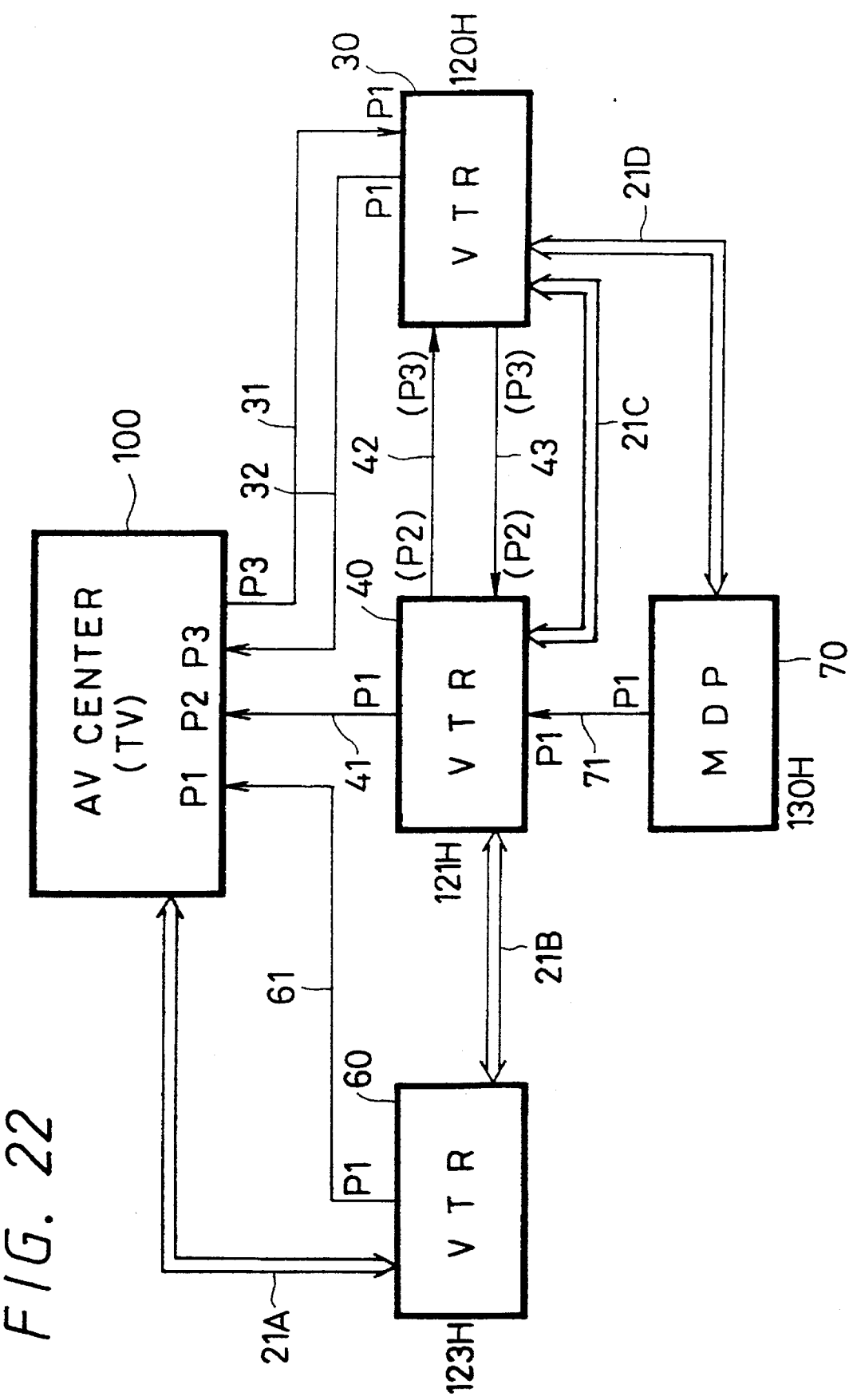
FIG. 22 is a block diagram showing an example of an arrangement of an AV system.

FIG. 22 shows other embodiment of the AV system from which the VTR 50 and the tuner 80 are omitted. In this case, as shown in FIG. 23, the non-use flag N are set top the VTR 50 and the tuner 80.

Figure 24:
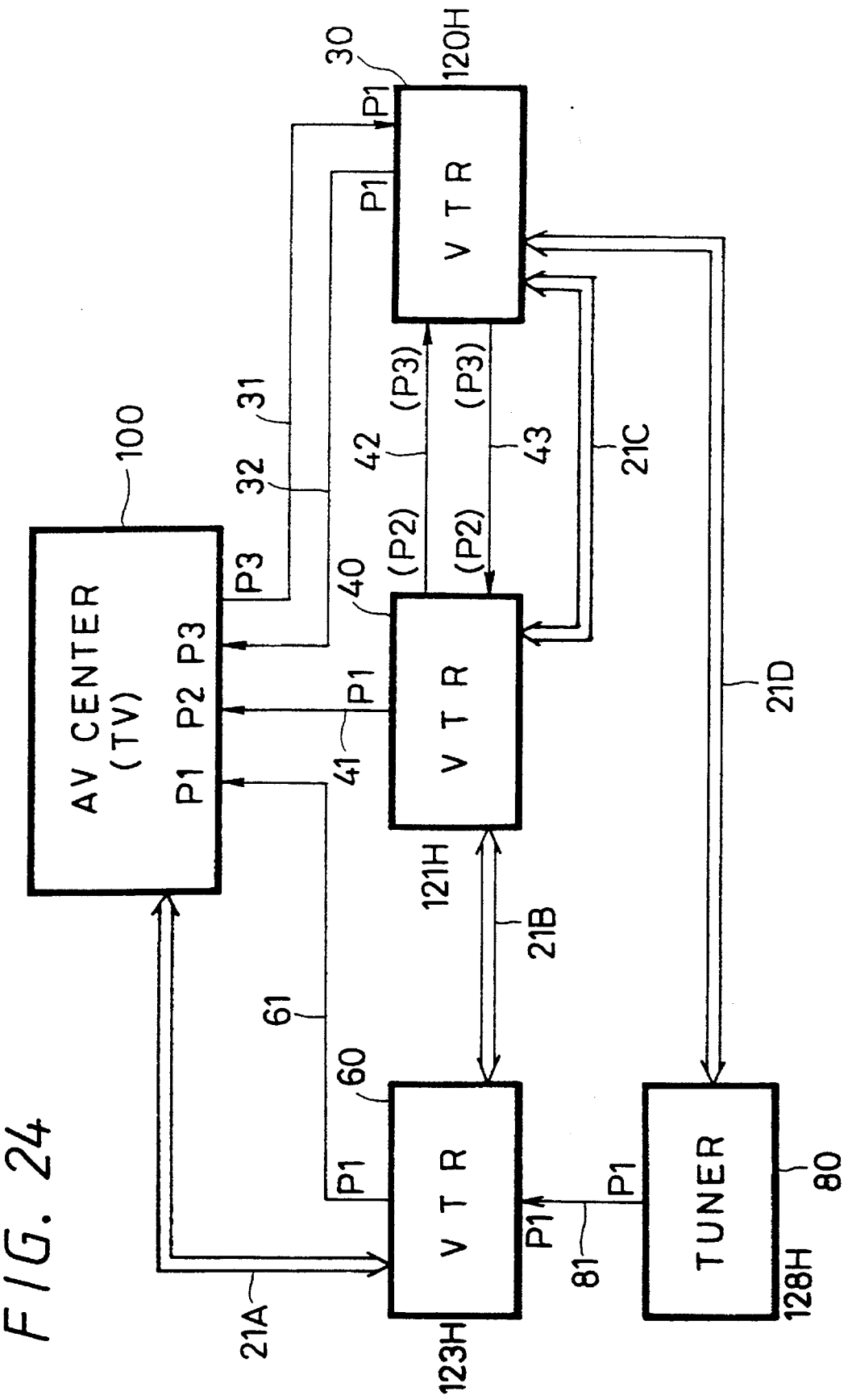
FIG. 24 is a block diagram showing an example of an arrangement of an AV system.

FIG. 24 shows other embodiment of the AV system from which the VTR 50 and the MDP 70 are omitted. In this case, as shown in FIG. 24, the non-use flag is set to the VTR 50 and the MDP 70.

Figure 26:
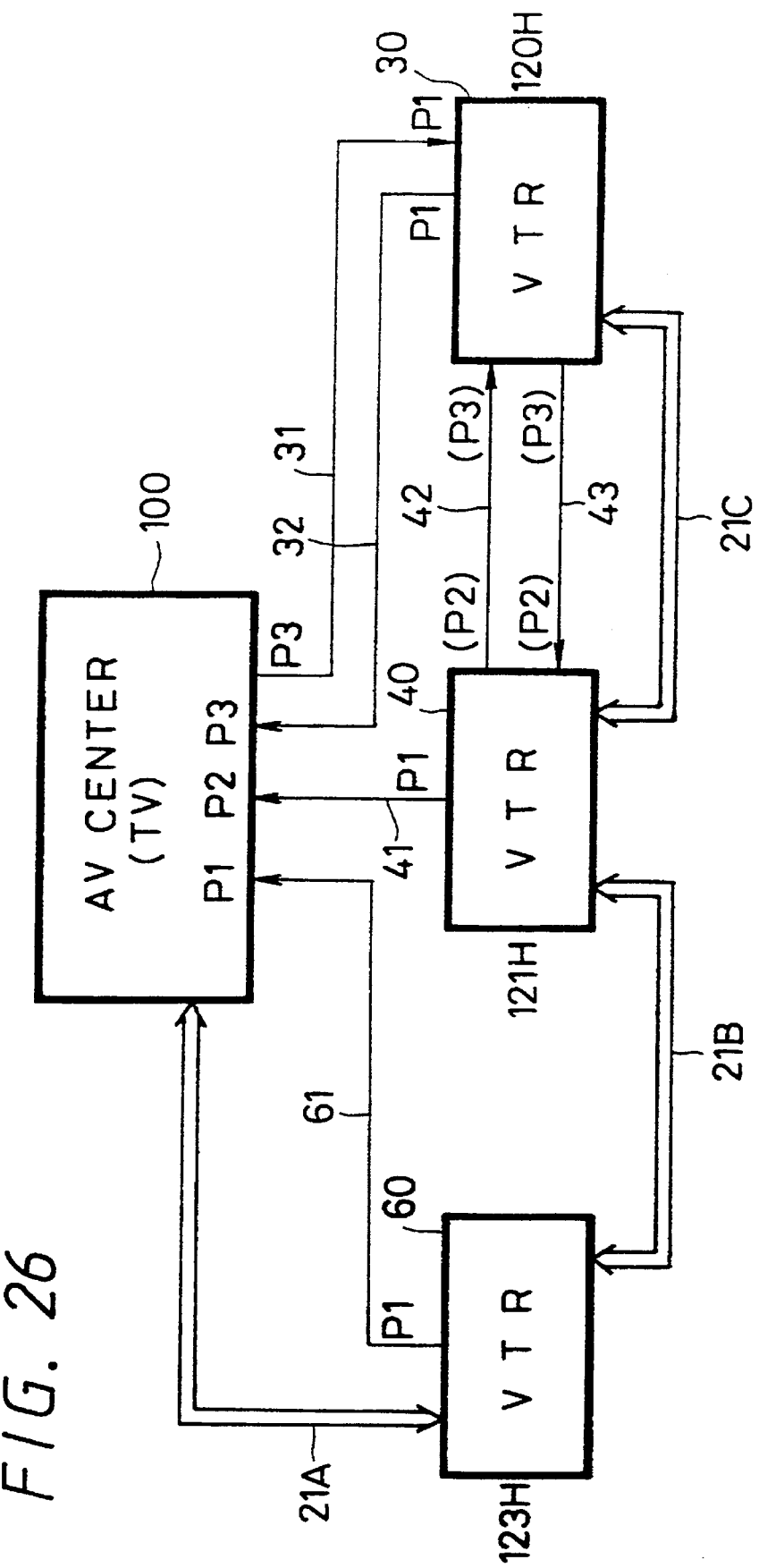
FIG. 26 is a block diagram showing an example of an arrangement of an AV system.

In other embodiment shown in FIG. 26, the VTR 50, the MDP 70 and the tuner 80 are omitted from the AV system. Accordingly, in this case, as shown in FIG. 27, the non-use flag N is set to the three equipments of the VTR 50, the MDP 70 and the tuner 80.

Figure 28:
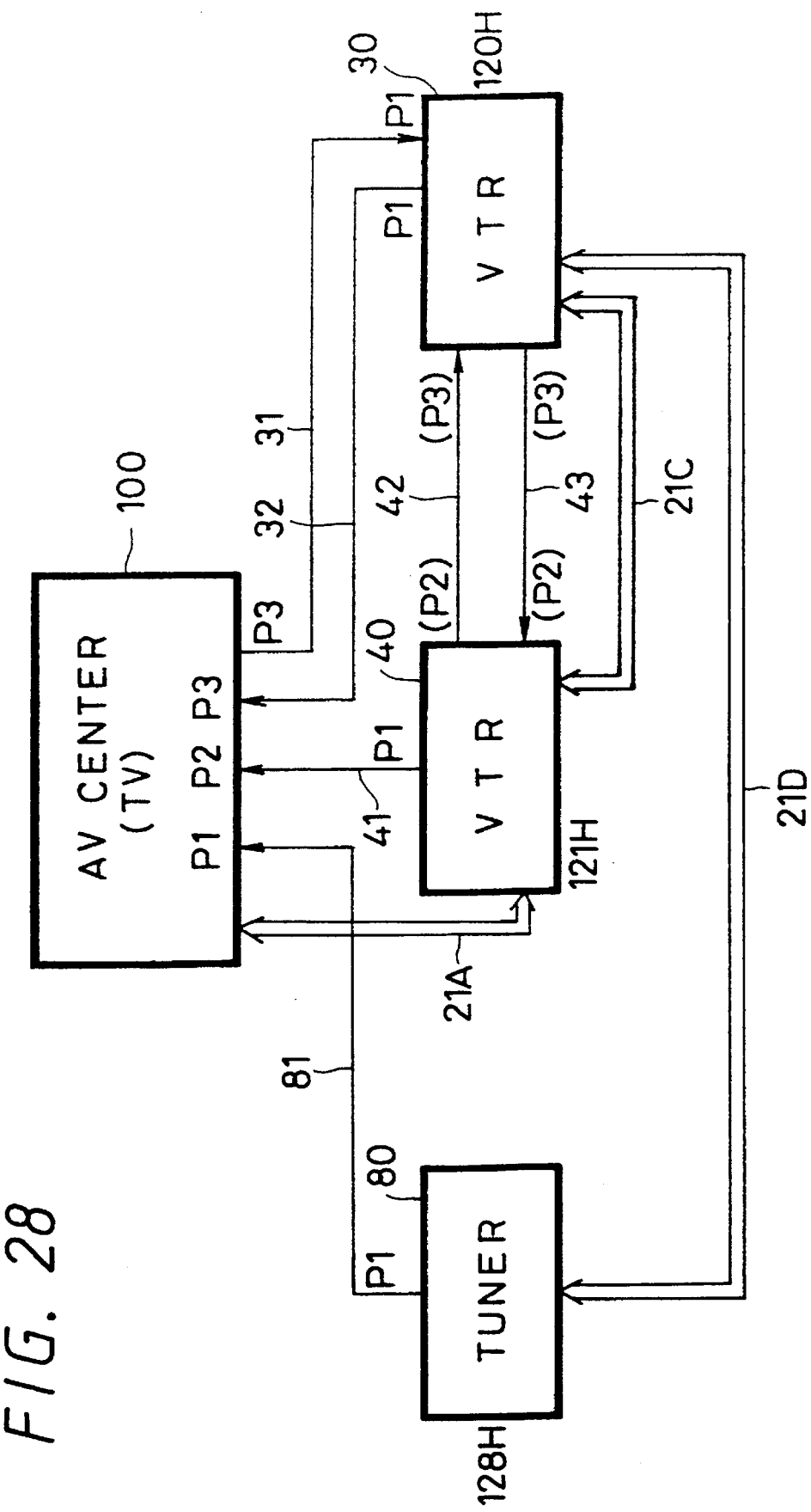
FIG. 28 is a block diagram showing an example of an arrangement of an AV system.

In other embodiment shown in FIG. 28, the VTR 50, the MDP 70 and the VTR 60 are omitted from the AV system. Accordingly, in this case, as shown in FIG. 29, the non-use flag N is set to the VTR 50, the VTR 60 and the MDP 70.

In other embodiment shown in FIG. 30, the VTR 40, the VTR 50 and the tuner 80 are omitted from the AV system. Accordingly, in this case, as shown in FIG. 31, the non-use flag N is set to the VTR 40, the VTR 50 and the tuner 80.

As described above, if the flag is set to the non-use AV equipments of the AV equipments prepared on the tables and the AV system composed of much more AV equipments is selected, it becomes possible to substantially manage the AV system composed of lesser AV equipments.

While the equipment flag representing the equipments described in the standard pattern but not in actual use is memorized as described above, a flag (path) can be used to determine whether or not the connection line (path) which is described in the standard pattern but is not connected in actual practice is used. FIGS. 32 and 33 show such embodiments. With this arrangement, it is possible to reduce prepared data base much more.

Specifically, with this arrangement, the standard pattern shown in FIG. 4 and the standard pattern shown in FIG. 6 can use a common data base. In this embodiment, when there is the AV system shown in FIG. 1, if data indicative of all possible connected states are memorized in advance, then it becomes possible to manage a pattern with the same electronic equipments but with different connected states under the common standard pattern.

Data bases of the AV systems shown in FIGS. 4 and 6 are the same configuration as shown in FIGS. 32 and 33. Specifically, all equipments composing the AV system and all possible connected states (connection lines) are described in these data bases. Then, of the described paths, the non-use flag N is set to a path which is not yet connected (used) in actual practice.

When the AV system with the standard pattern shown in FIG. 1 is connected as shown in FIG. 4 in actual practice, data are described in the data base as shown in FIG. 32. Specifically, in the AV system shown in FIG. 4, a path connecting the VTR 40 and the VTR 60 is not used in actual practice. Therefore, the non-use flag N is set to the path extending from the plug P2 of the VTR 40 to the plug P2 of the VTR 60 and to the path extending from the plug P2 of the VTR 60 to the plug P2 of the VTR 40.

When the AV system with the standard pattern shown in FIG. 1 is used in actual practice under the condition that the VTR 30 and the VTR 40 are not connected and the VTR 40 and the VTR 60 are connected as shown in FIG. 6, the patterns are managed under the data base shown in FIG. 33. Specifically, of previously-prepared paths, the non-use flag N is set to the path extending from the plug P2 of the VTR 40 to the plug P3 of the VTR 30 and to the path extending from the plug P3 of the VTR 30 to the plug P2 of the VTR 40.

When the flag N is set to the path which is not in actual practice in the paths previously prepared in the standard pattern, the CPU 4 can detect a difference between the path of the standard pattern and the actual path. Therefore, when the respective AV equipments are controlled, it is possible to confirm the fundamental connected state on the basis of the table memorized in the connection configuration information ROM 5A. Further, it is possible to determine on the basis of the path flag memorized in the nonvolatile memory 7 a path which actually exists. Therefore, proper commands can be sent to the respective AV equipments in response to the judged results.

Figure 34:
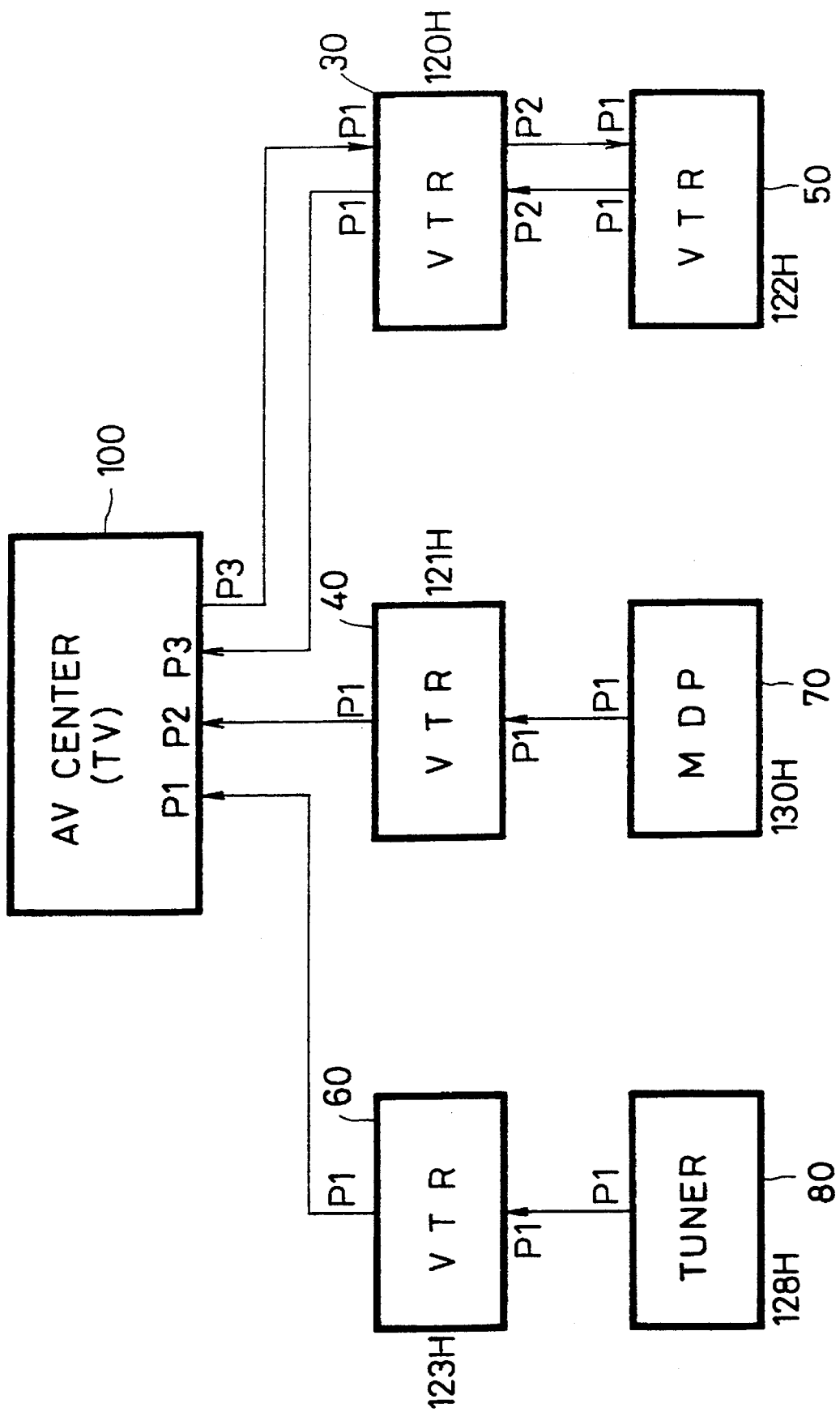
FIG. 34 is a block diagram showing an example of an arrangement of an AV system.
Figure 36:
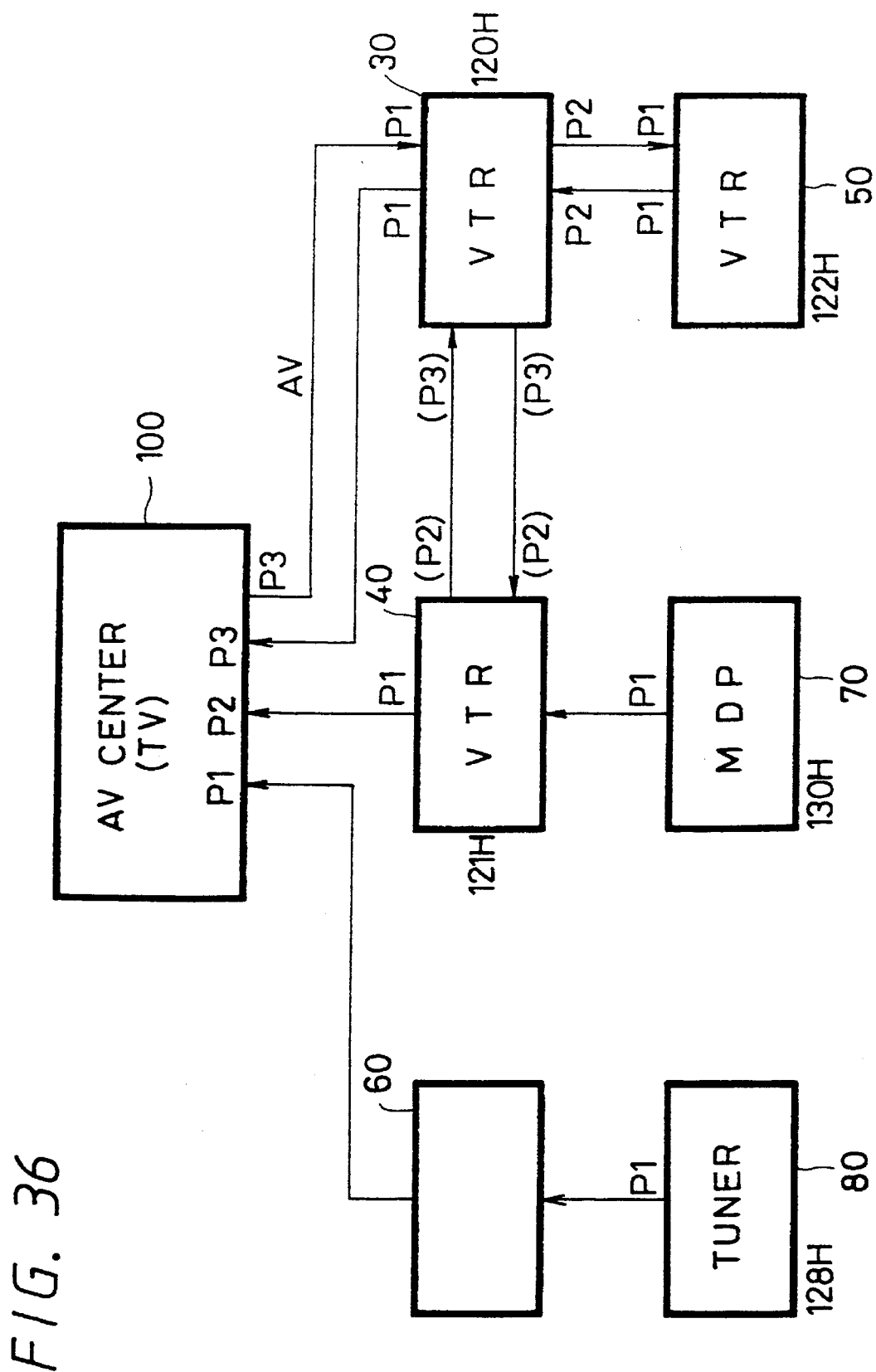
FIGS. 36 through 51 are diagrams used to explain examples of displayed standard patterns of the AV system, respectively.

In other embodiment shown in FIG. 34, not only the connection between the VTR 30 and the VTR 40 but also the connection between the VTR 40 and the VTR 60 is removed. In this case, as shown in FIG. 35, the non-use flag N is set to the path extending from the plug P2 of the VTR 40 to the plug P3 of the VTR 30, the path extending from the plug P3 of the VTR 30 to the plug P2 of the VTR 40, the path extending from the plug P2 of the VTR 40 to the plug P2 of the VTR 60 and the path extending from the plug P2 of the VTR 60 to the plug P2 of the VTR 40.

If the user allows a display command for displaying a standard pattern selected at present to be issued by operating the operation button 1 or the commander 12, then the CPU 4 reads out the presently-selected standard pattern from the standard patterns memorized in the connection configuration information ROM 5A, controls the picture display IC 14 and generates and supplies image data corresponding to the read-out standard pattern to the CRT 13 which then displays an image of the corresponding standard pattern. When the standard pattern shown in FIG. 5, for example, is selected, the CRT 13 displays an image corresponding to the standard pattern shown in FIG. 4.

In the case of this embodiment, when a predetermined AV equipment of the AV equipments composing the AV system is not in use, such predetermined AV equipment is not removed but a message indicating that the predetermined AV equipment is not in use may be displayed on the picture screen of the CRT 13.

Figure 37:
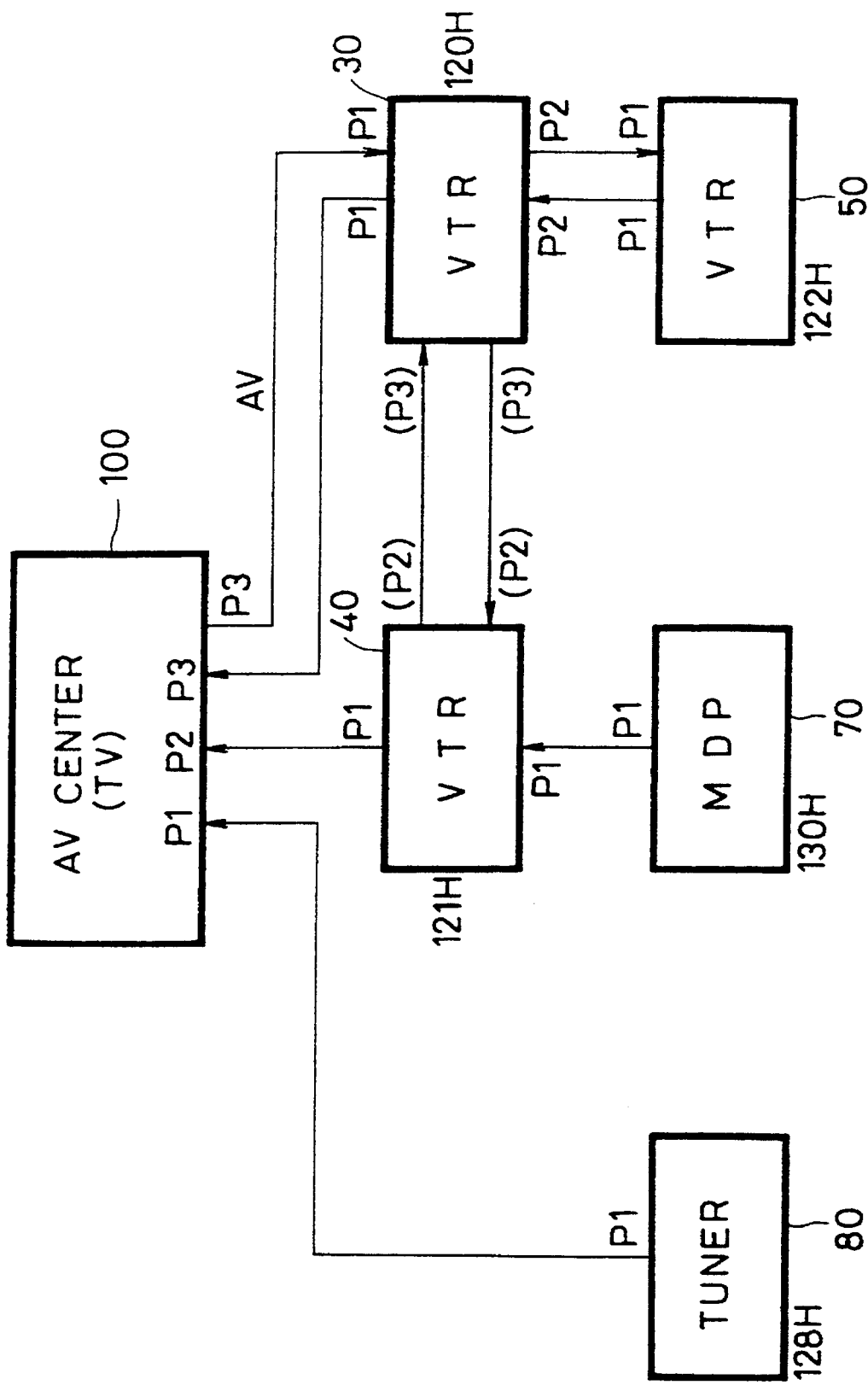
Figure 38:
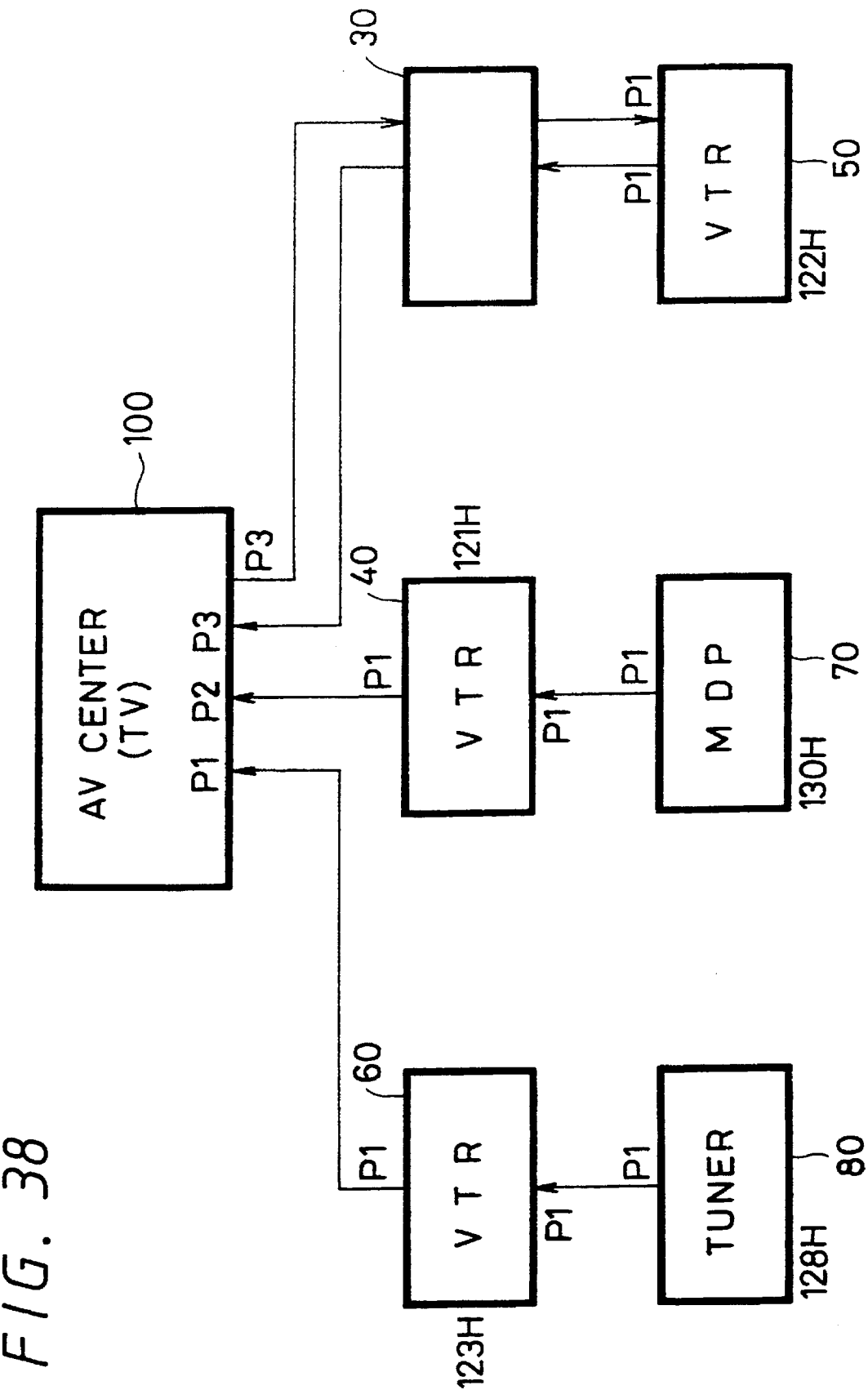

By way of example, when the VTR 60 of the AV equipments composing the AV system is not in use as shown in FIG. 9, the CRT 13 displays the standard pattern in the form such that the VTR 60 is not omitted as shown in FIG. 37 but that the VTR 60 is displayed with characters not added in the bloc of the VTR.

AV equipments that are connected in actual practice are displayed with characters, such as VTR, AV CENTER, MDP, TUNER or the like added to their blocks. Therefore, the user can easily distinguish the AV equipments that are now actually connected and the AV equipments that are not connected from each other. Thus, when the AV system is expanded, it becomes possible for the user to easily confirm where to add new AV equipments.

Similarly, when the AV system is such one that the VTR 30 is removed from the standard pattern as shown in FIG. 11, the display shown in FIG. 10 is not carried out but the display shown in FIG. 18 is carried out. Also in this case, one block is displayed at the position to which the VTR 30 should be connected originally.

Figure 39:
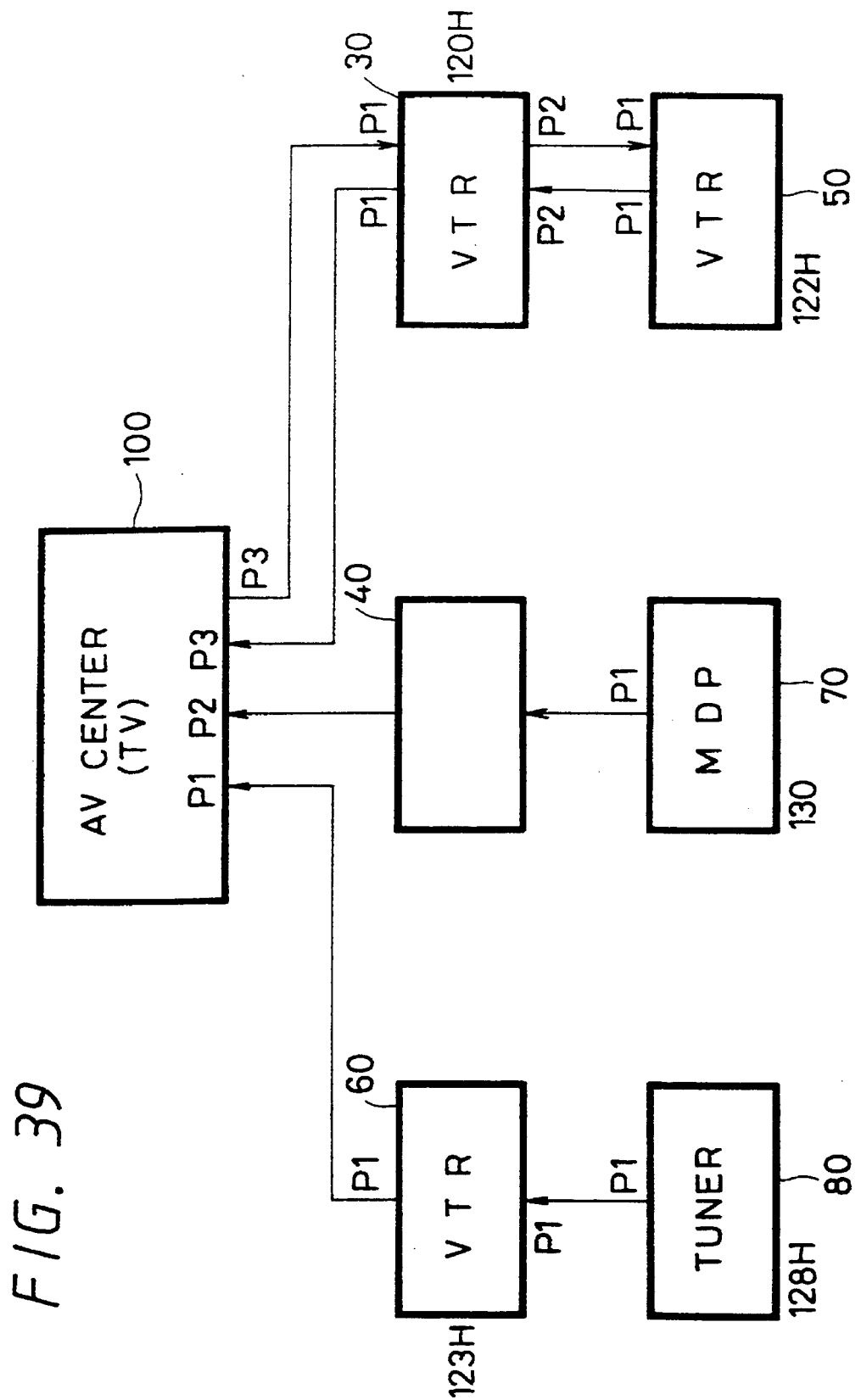

When the AV system is such one that the VTR 40 is removed from the standard pattern as shown in FIG. 13, the display shown in FIG. 12 is not carried out but the display shown in FIG. 39 is carried out.

Figure 40:
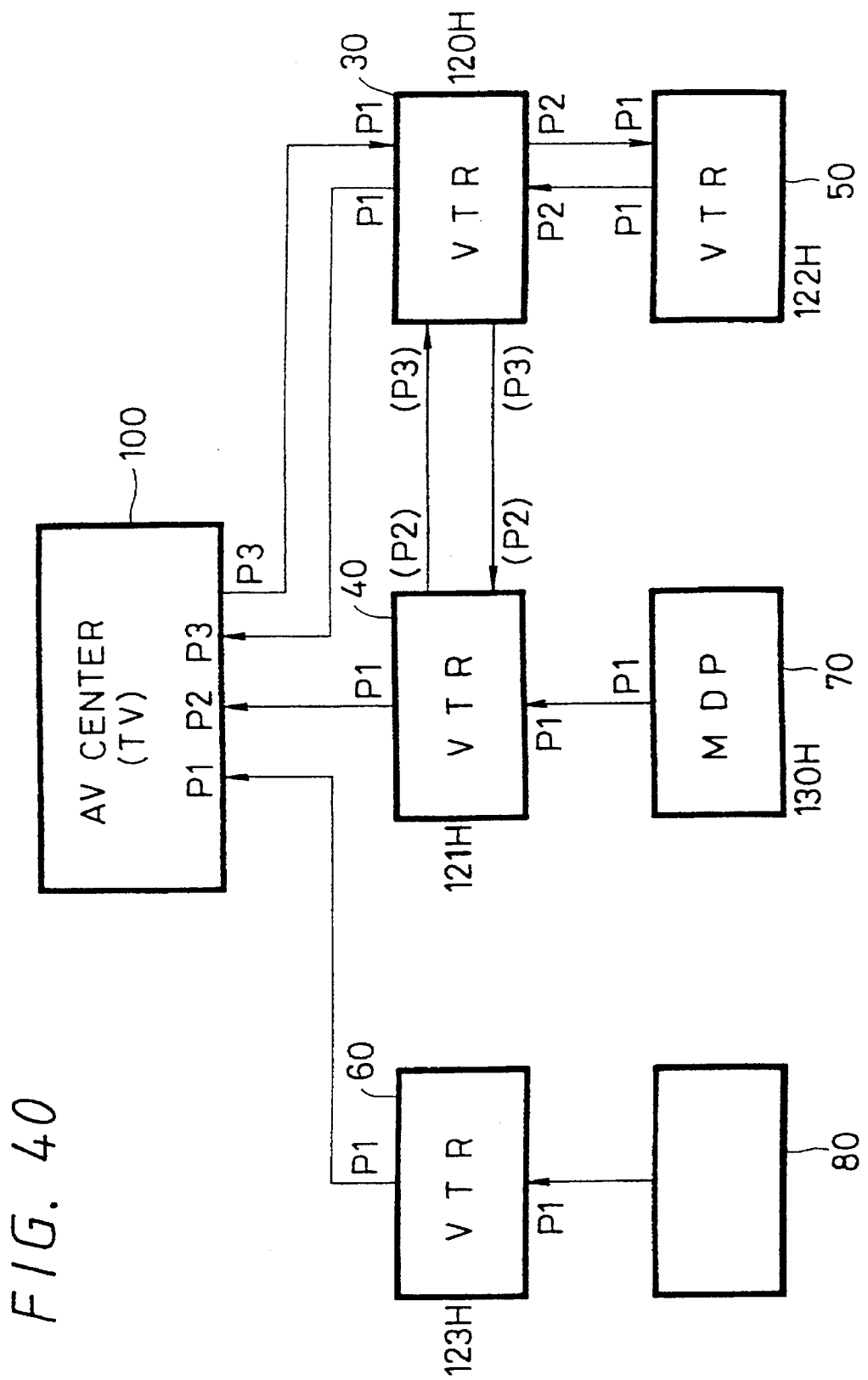

When the AV system is such one that the tuner 80 is omitted from the standard pattern as shown in FIG. 15, the display shown in FIG. 14 is not carried out but the display shown in FIG. 40 is carried out.

Figure 41:
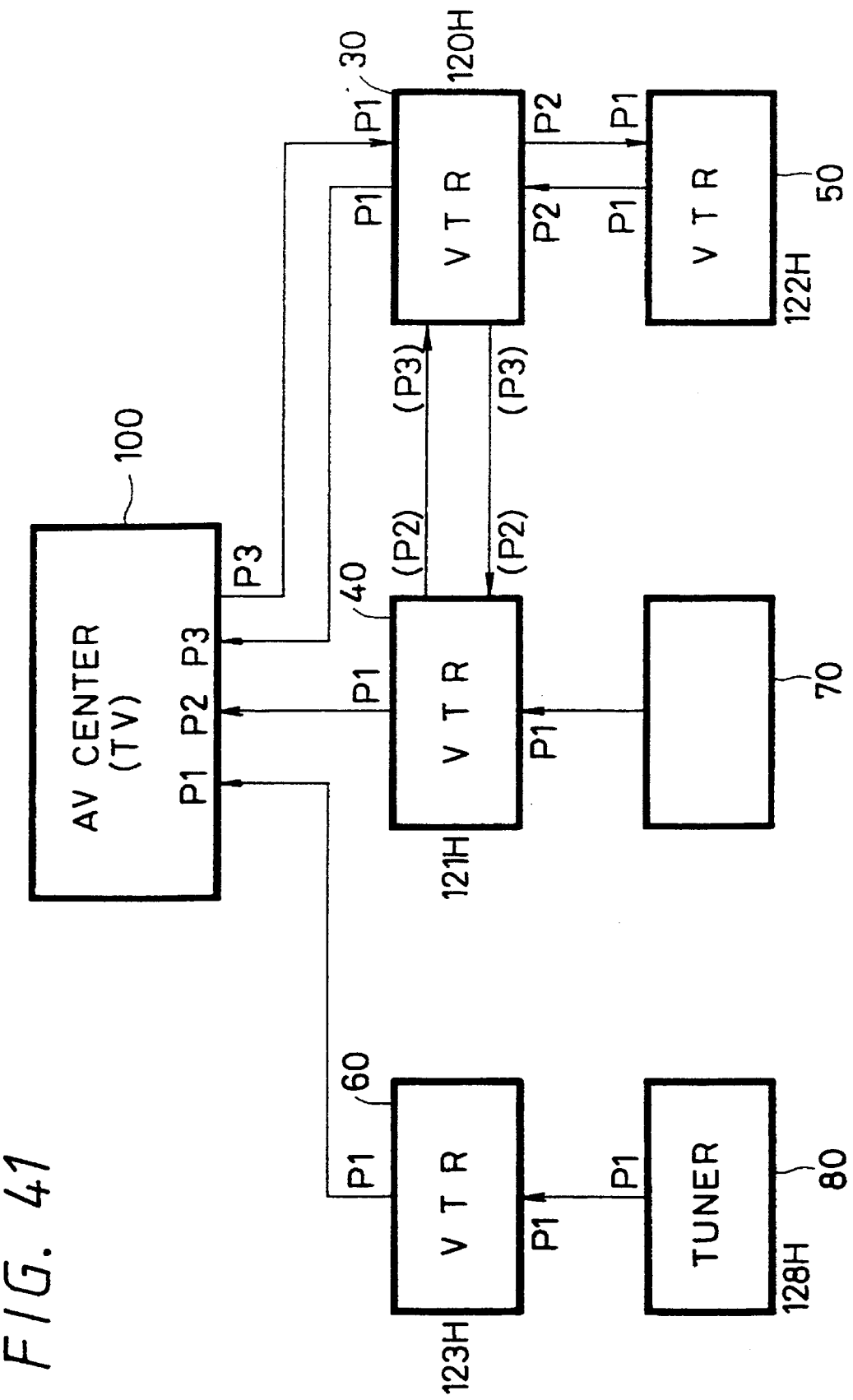

When the AV system is such one that the MDP 70 is omitted from the standard pattern as shown in FIG. 17, the display shown in FIG. 16 is not carried out but the display shown in FIG. 41 is carried out.

Figure 42:
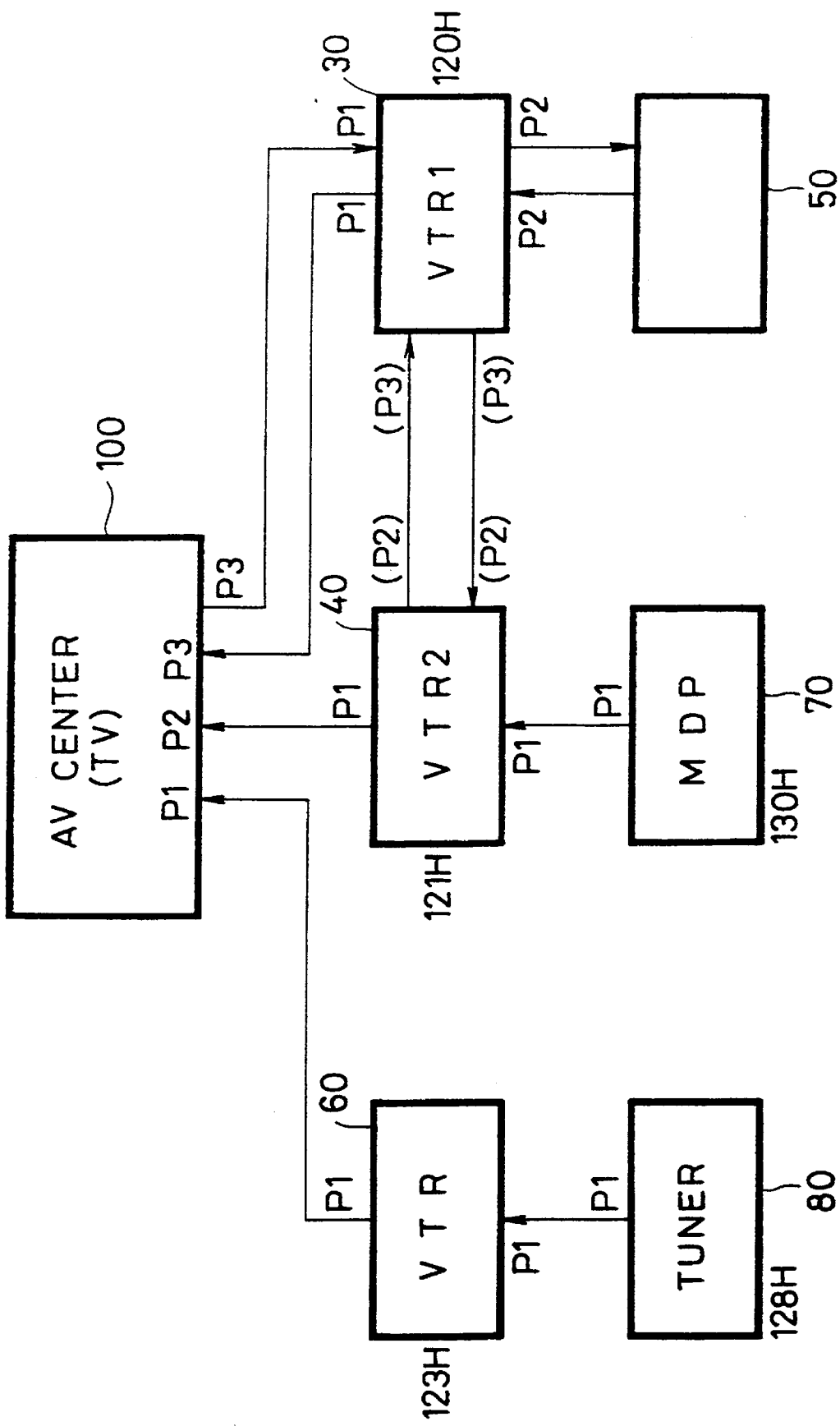

When the AV system is such one that the VTR 50 is omitted from the standard pattern as shown in FIG. 19, the display shown in FIG. 18 is not carried out but the display shown in FIG. 42 is carried out.

Figure 43:
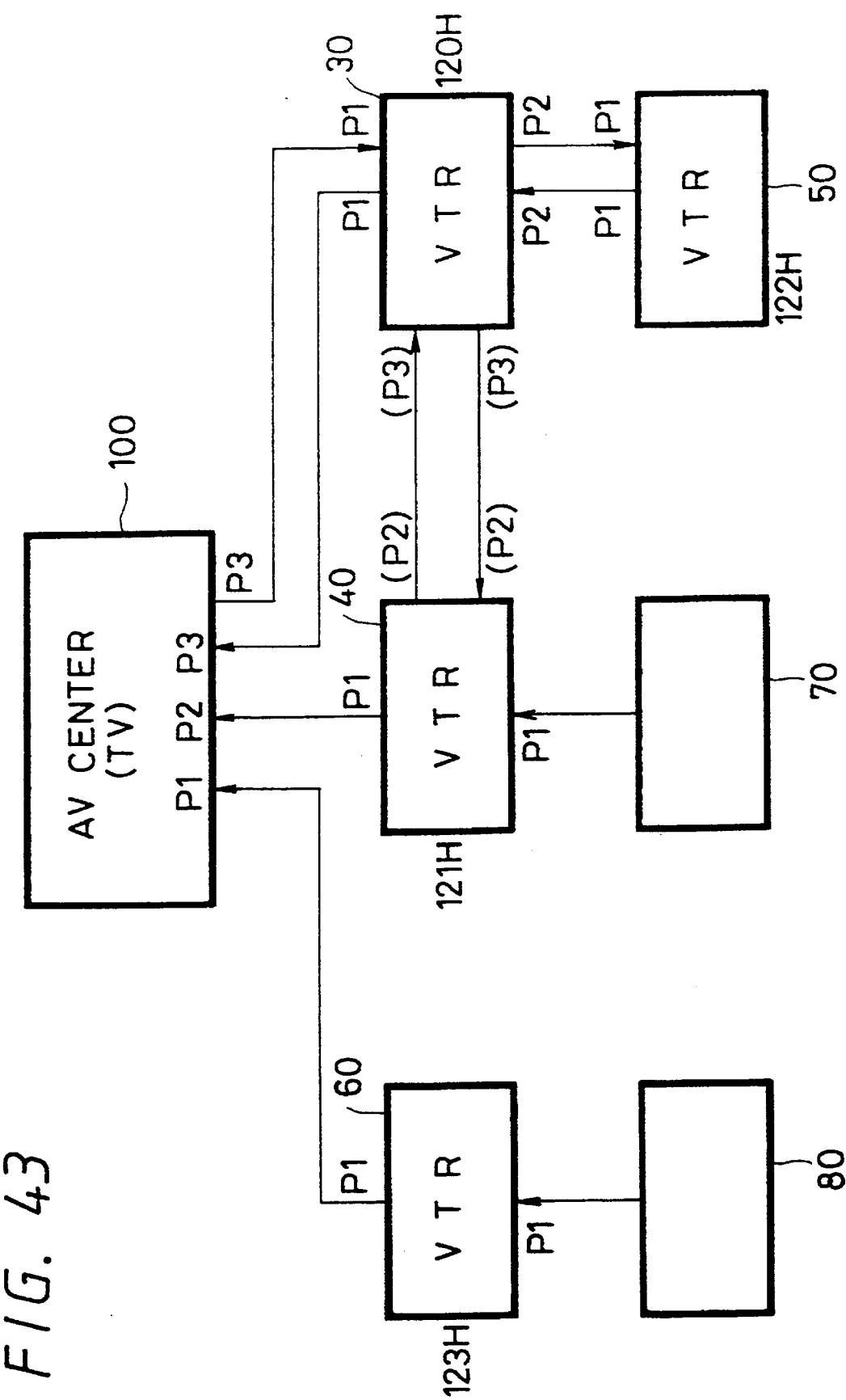

When the AV system is such one that the MDP 70 and the tuner 80 are omitted from the standard pattern as shown in FIG. 21, the display shown in FIG. 20 is not carried out but the display shown in FIG. 43 is carried out.

Figure 44:
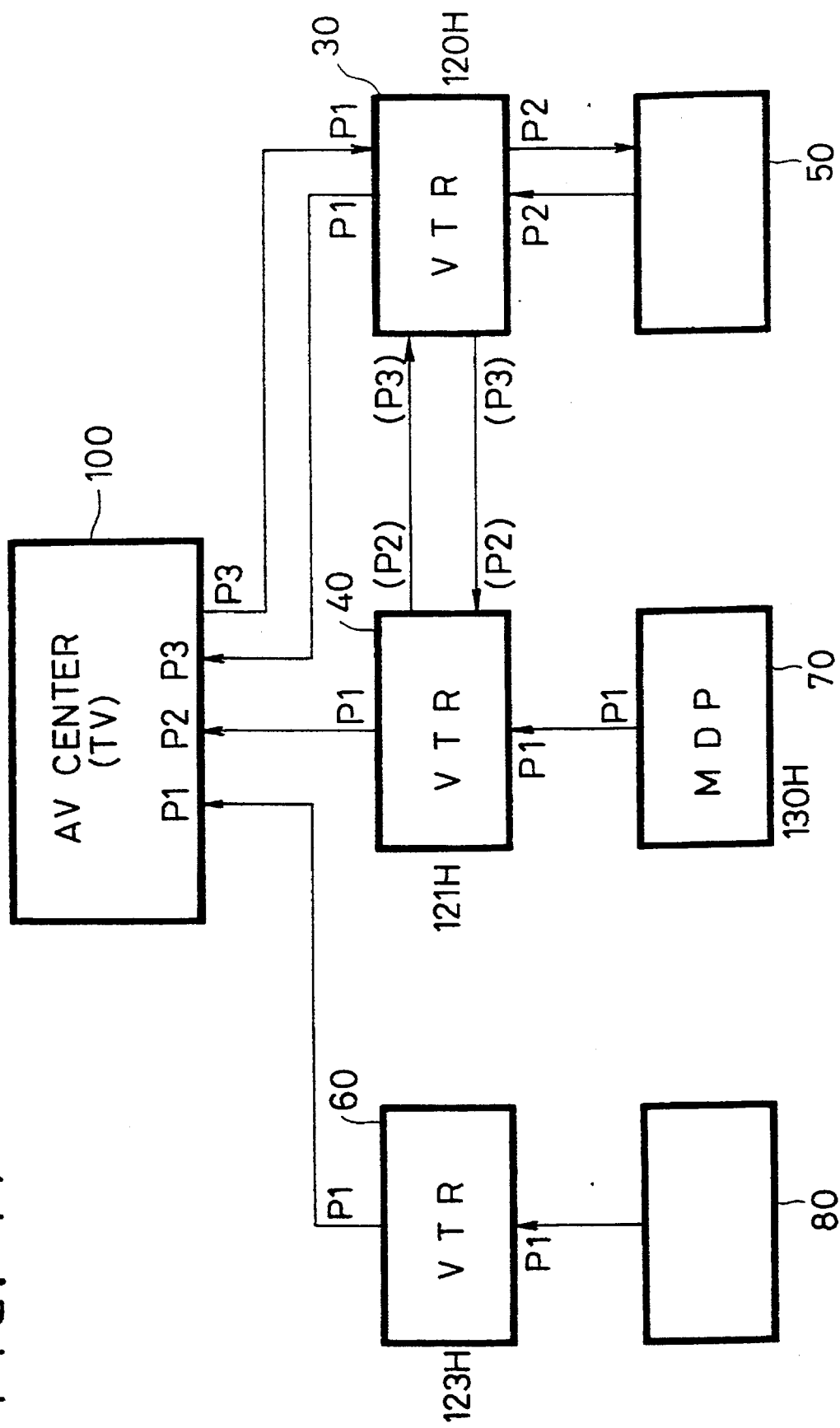

When the AV system is such one that the VTR 50 and the tuner 80 are omitted from the standard pattern as shown in FIG. 23, the display shown in FIG. 22 is not carried out but the display shown in FIG. 44 is carried out.

Figure 45:
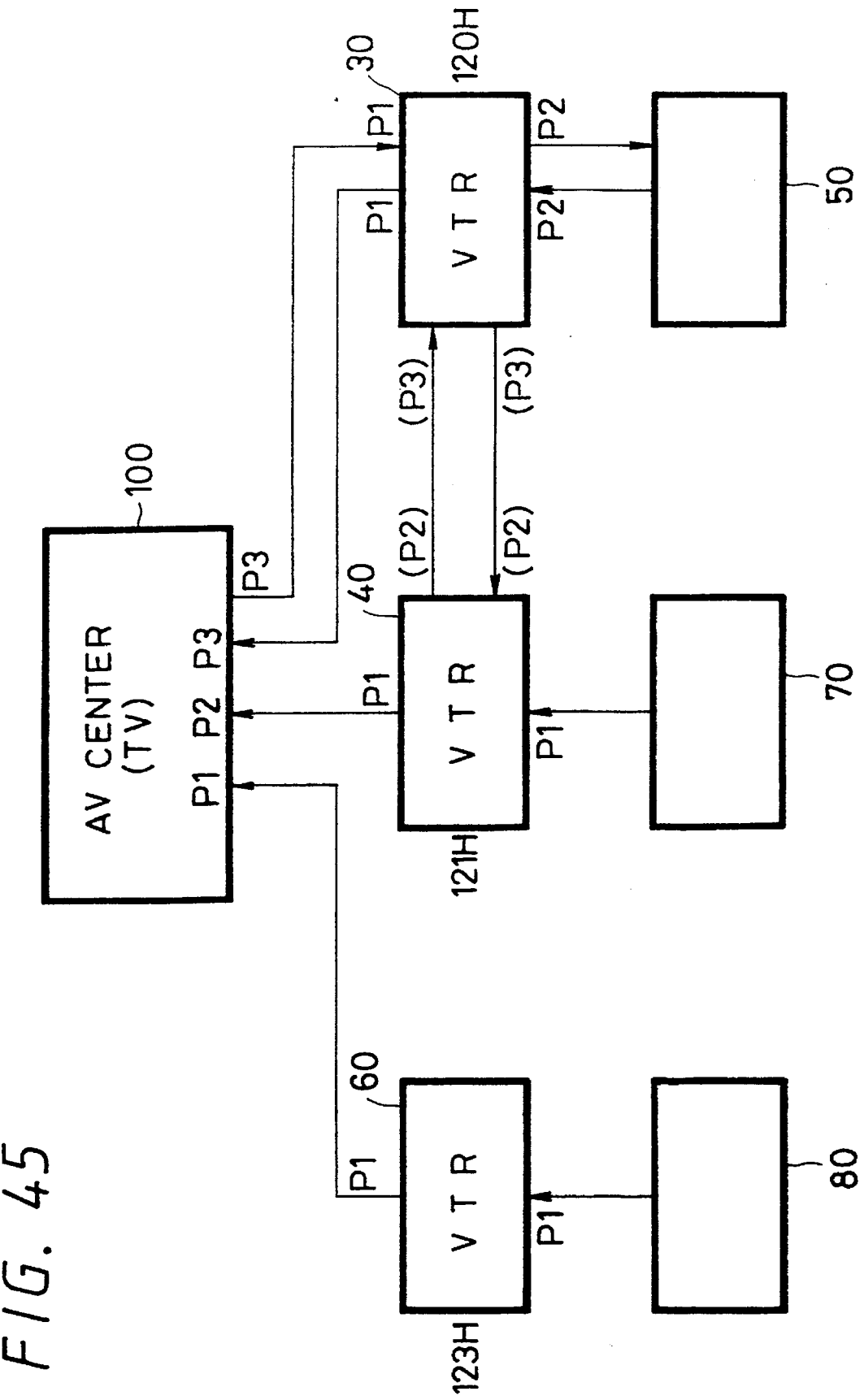

When the AV system is such one that the VTR 50, the MDP 70 and the tuner 80 are omitted from the standard pattern as shown in FIG. 27, the display shown in FIG. 26 is not carried out but the display shown in FIG. 45 is carried out.

Figure 46:
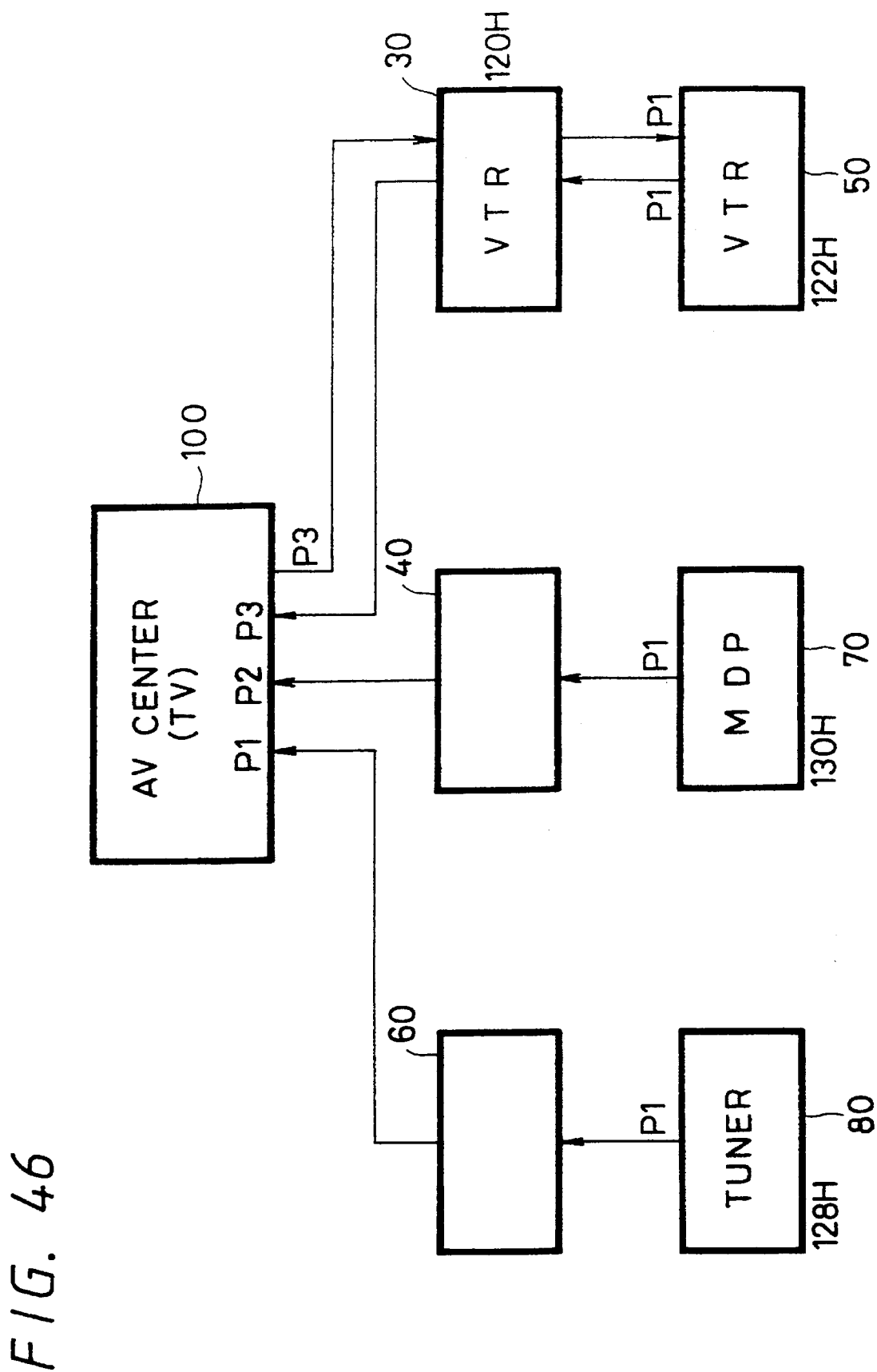
Figure 47:
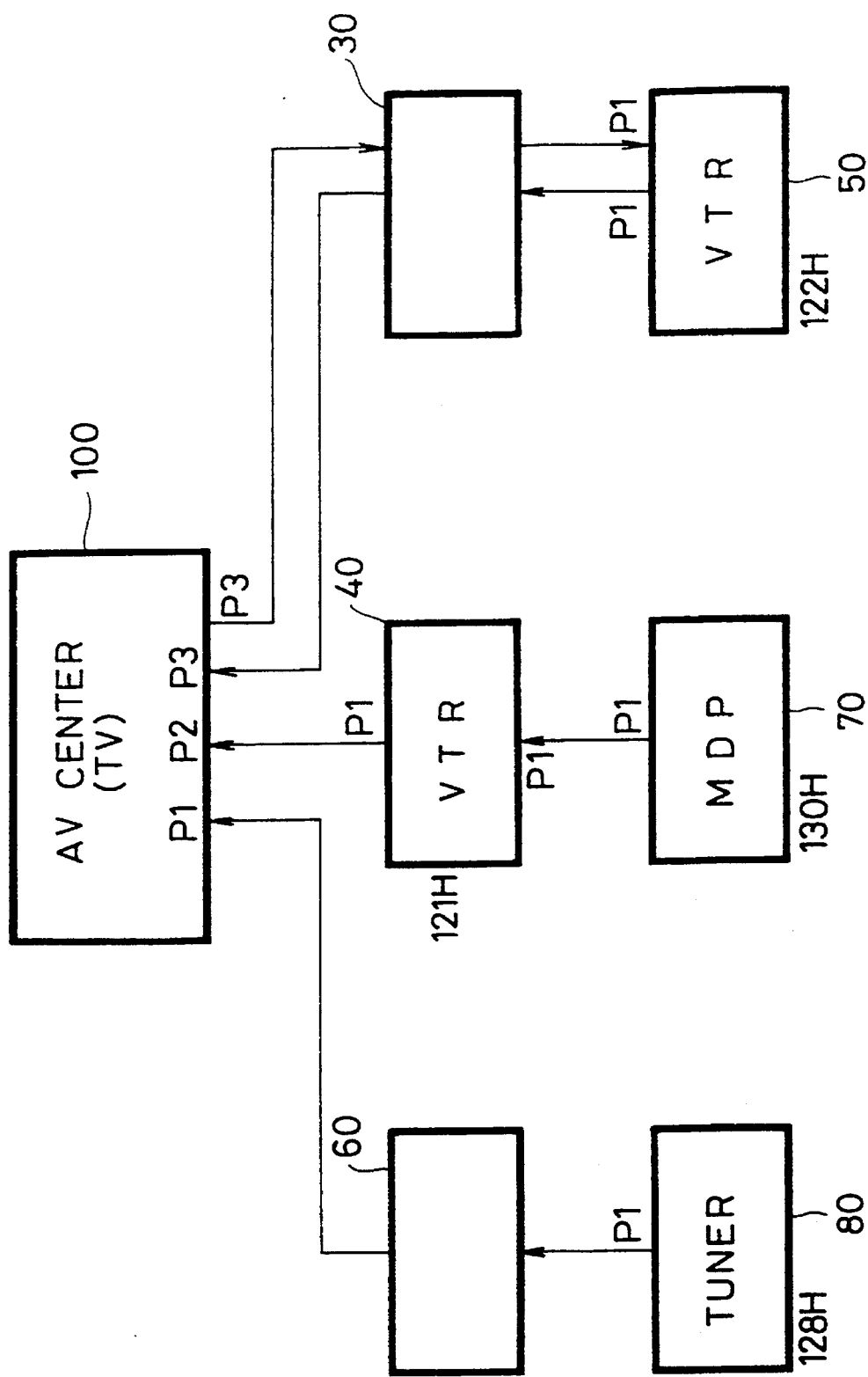
Figure 48:
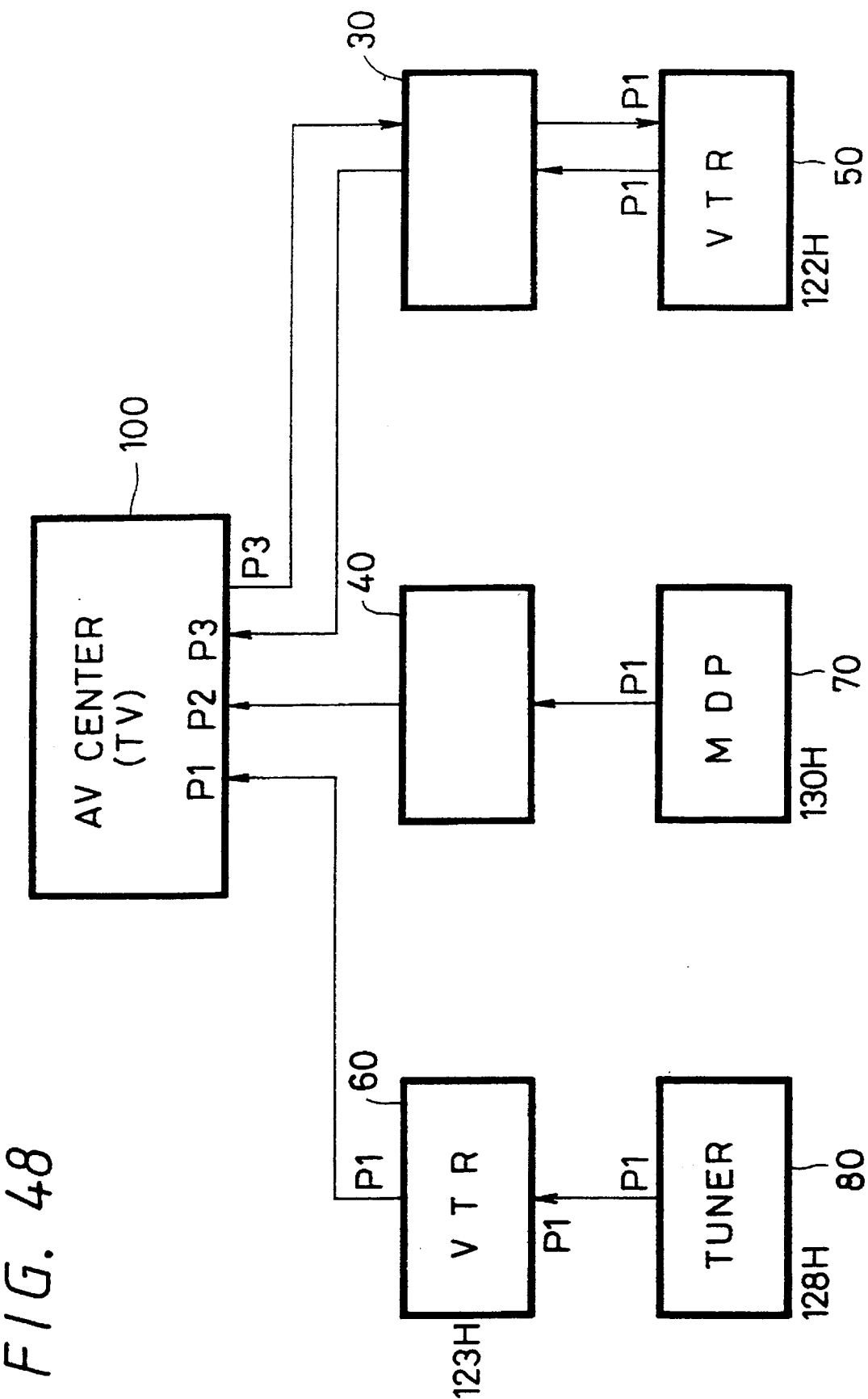
Figure 49:
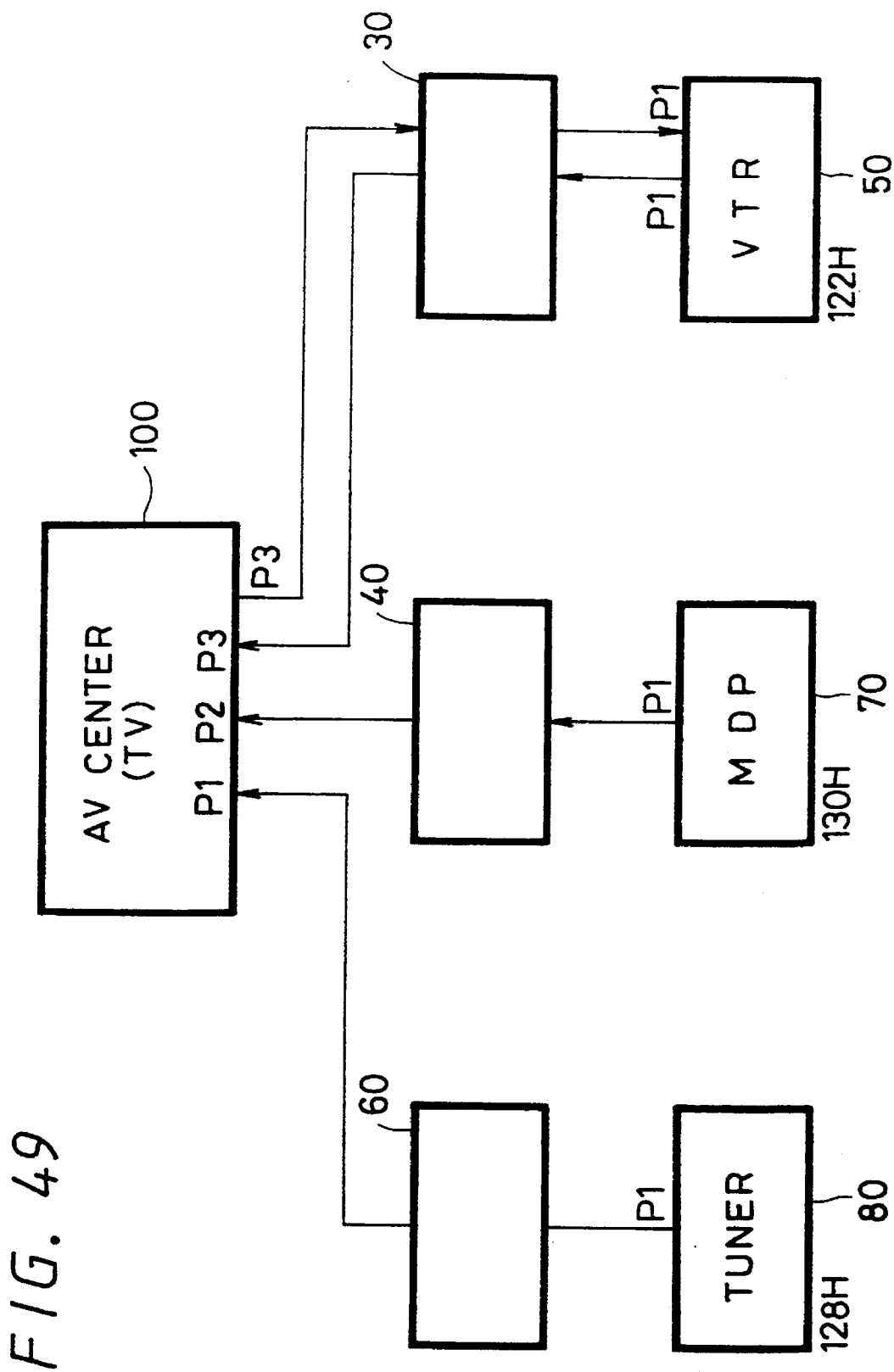

Similarly, when the VTR 40 and the VTR 60 are omitted from the standard pattern, the display shown in FIG. 46 is carried out. When the VTR 30 and the VTR 60 are omitted from the standard pattern, the display shown in FIG. 47 is carried out. When the VTR 30 and the VTR 40 are omitted from the standard pattern, the display shown in FIG. 48 is carried out. When the VTR 30, the VTR 40 and the VTR 60 are omitted from the standard pattern, the display shown in FIG. 49 is carried out.

Further, when the standard pattern is displayed as described above, as shown in FIG. 50, for example, an AV signal line which is made active (now receiving attention) by the feature execution or the like in the AV signal lines can be displayed so as to be distinguished from other signal lines. According to the embodiment shown in FIG. 50, the output of the tuner 80 is supplied to the VTR 60 and the signal output from the VTR 60 is supplied to the plug P1 of the AV center 100, whereby the AV signal lines 81 and 61 are displayed in red.

Alternatively, the AV signal line can be displayed with thickness and concentration different from those of other AV signal lines. Further, the AV signal line which now receives an attention can be flashed.

With the above-mentioned arrangement, the user can recognize the AV signal line which now receives an attention with ease reliably, thereby making it possible to prevent troubles, such as an erroneous connection or the like.

Figure 50:
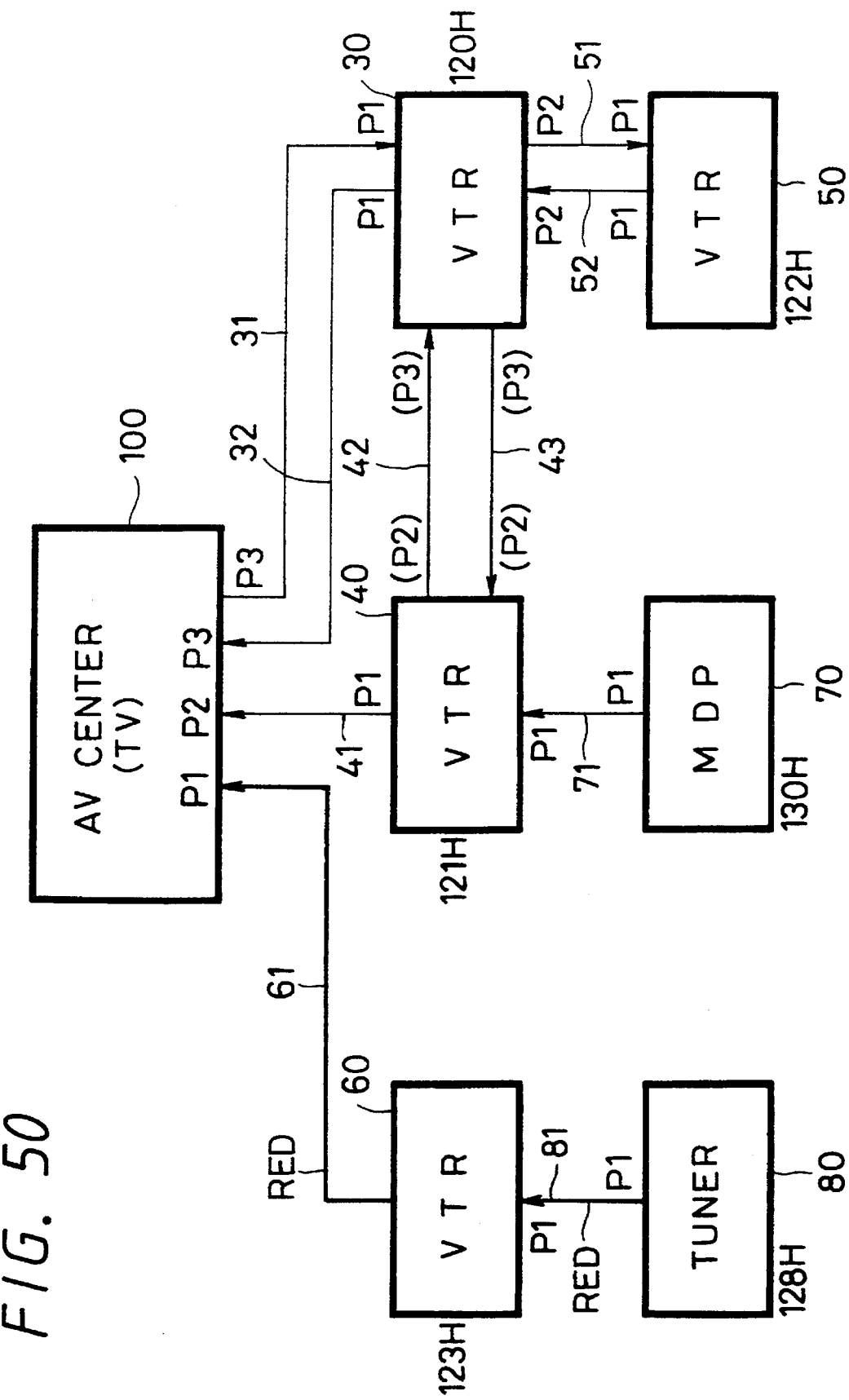
Figure 51:
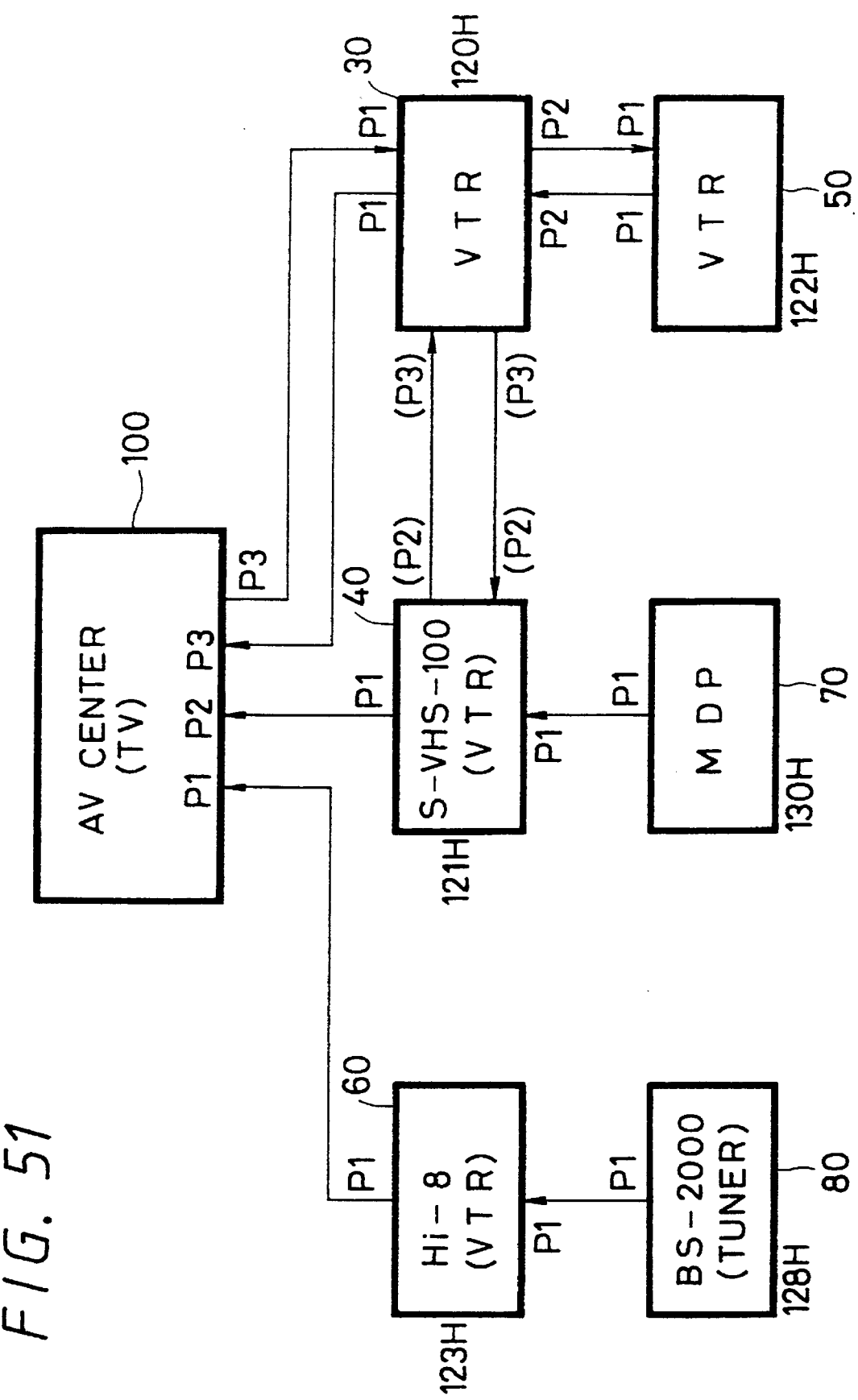

Furthermore, when the standard pattern is displayed, as shown in FIG. 50, for example, specific mode number and product name, such as S-VHS-100, Hi-8, VS-2000 can be displayed as names of respective blocks instead of general names such as VTR, MDP, tuner or the like. In this case, there is required a processing in which the user should designate names in advance.

Figure 52:
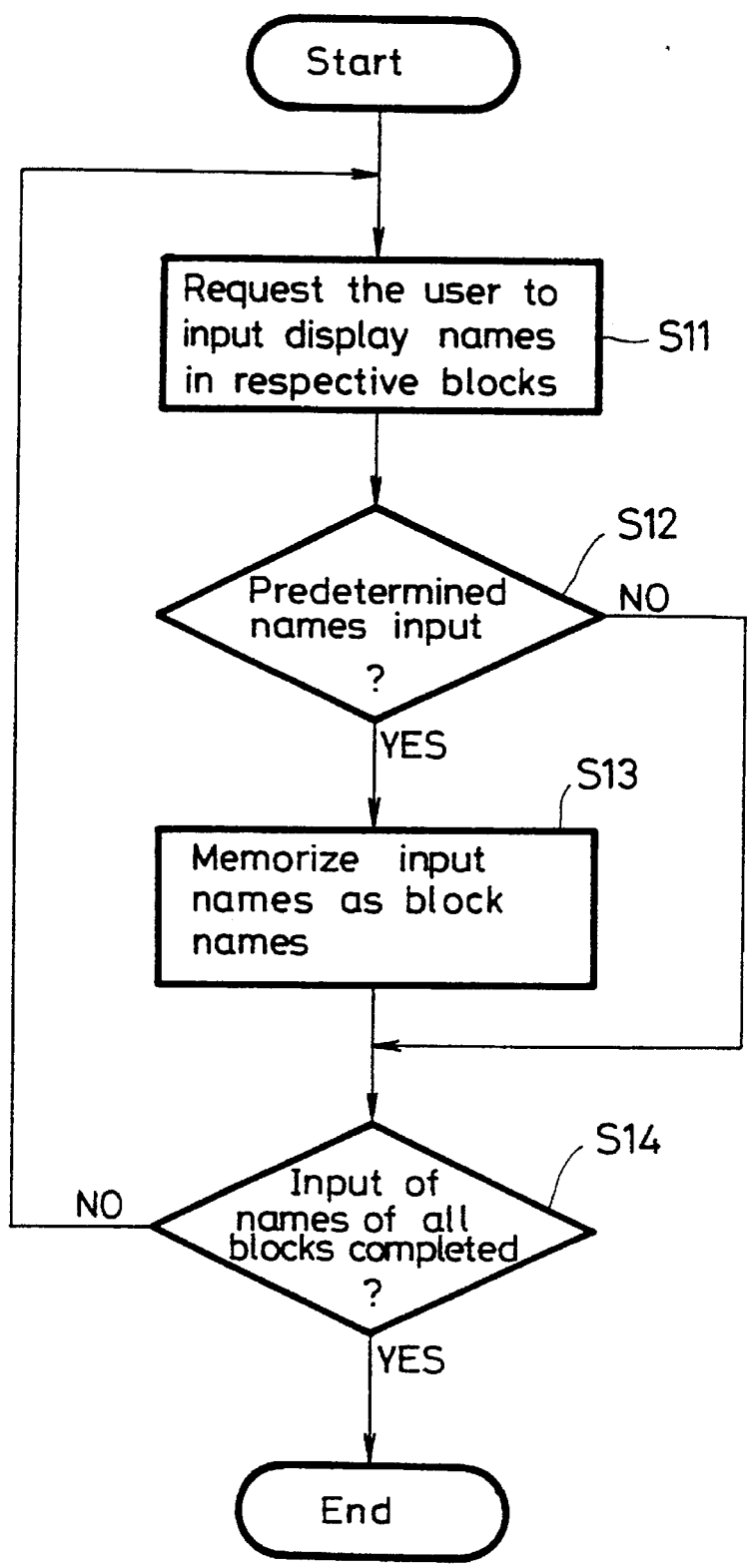
FIG. 52 is a flowchart to which reference will be made in explaining a processing executed when the standard pattern of the AV system is displayed as shown in FIG. 51.

FIG. 52 is a flowchart showing a processing in which the user designates names.

Referring to FIG. 52, following the start of operation, in step S11, the CPU 4 controls the picture display IC 14 to display a predetermined message on the CRT 13 to thereby request the user to input display names in respective blocks. It is determined in the next decision step S12 whether or not the user input predetermined names. If predetermined names are input as represented by a YES at decision step S12, then the processing proceeds to step S13, whereat input names are supplied to and memorized in the nonvolatile memory 7, for example, as block names. If names are not designated as represented by a NO at decision step S12, then the processing of step S13 is skipped.

It is determined in next decision step S14 whether or not the input of names of all blocks is completed. If a NO is output at decision step S14, the above-mentioned steps are repeated until the input of names of all blocks is completed. If the input of names of all blocks is completed as represented by a YES at decision step S14, then the processing is ended.

Figure 53:
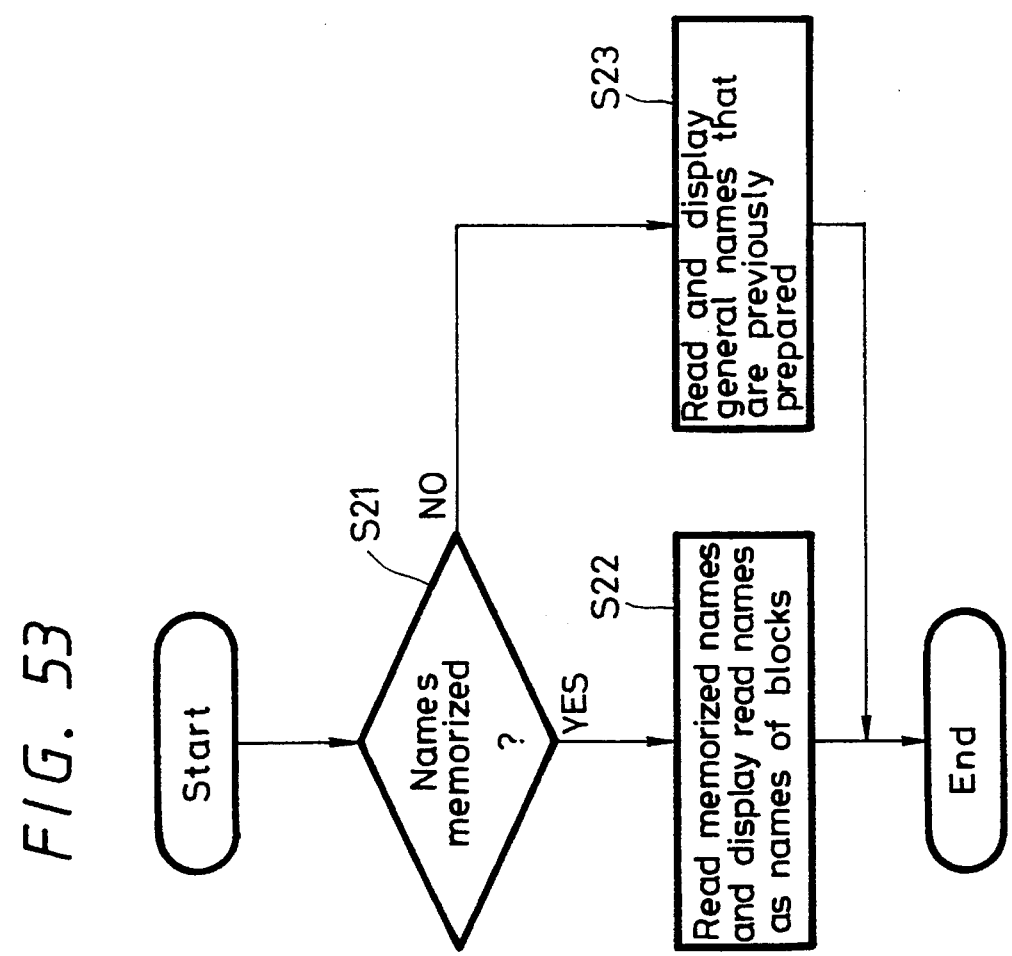
FIG. 53 is a flowchart to which reference will be made in explaining a processing executed when the standard pattern of the AV system is displayed as shown in FIG. 51.

When the display is carried out in actual practice after the input of names of all blocks is completed, the processing shown in a flowchart of FIG. 53 is carried out.

Referring to FIG. 53, following the start of operation, it is determined in decision step S21 whether or not names of respective blocks are memorized. If the names of blocks are memorized as represented by a YES at decision step S21, then the processing proceeds to step S22, whereat names memorized in the non-volatile memory 7 are read out and then displayed as the names of the blocks. Thus, as shown in FIG. 50, "S-VHS-100" is displayed as the name in the block of the VTR 40 instead of "VTR". In the block of VTR 60, "Hi-8" is displayed instead of "VTR". Further, in the block of the tuner 80, "BS-2000" is displayed instead of "tuner", respectively.

If particular names are not memorized as represented by a NO at decision step S21, then the processing proceeds to step S23, whereat general names that are prepared for the blocks in advance are displayed. In the blocks of the VTR 30 and the VTR 50, "VTR" are respectively displayed and "MDP" is displayed in the block of the MDP 70.

If individually designated names are displayed as described above, then when a plurality of AV equipments, each having the same function, are available (e.g., a plurality of VTRs are available), it is possible to suppress the user from operating the mistaken device inadvertently.

The AV center 100 can confirm the connected states of the respective AV equipments as follows. In this case, the AV center 100 implements the processing shown in a flowchart of FIG. 54 and the respective AV equipments (e.g., MDP 70) implements the processing shown in a flowchart of FIG. 55.

Figure 56:
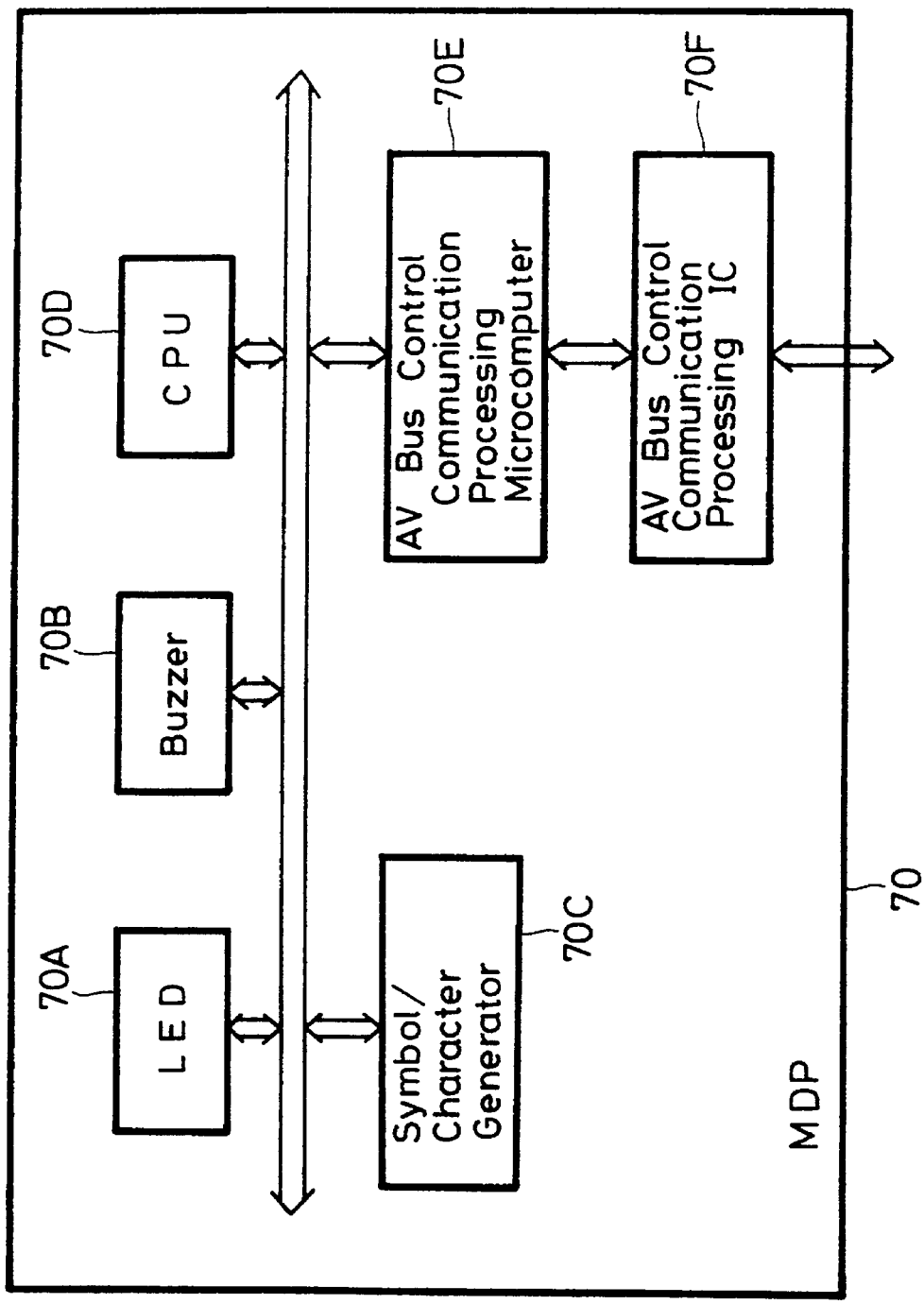
FIG. 56 is a block diagram showing an example of an arrangement of the MDP 70 shown in FIG. 1.

Each of the AV equipments, in this case, the MDP 70-includes, as shown in FIG. 56, an AV bus control communication processing IC 70F for effecting the processing concerning a command transmitted thereto through the control bus 21, and an AV bus control communication processing microcomputer 70E for effecting the processing corresponding to that command. The MDP 70 further includes a CPU 70D for controlling the whole operation of the MDP 70. Furthermore, the MDP 70 includes, in addition to fundamental devices for reproducing a video or compact disc to output video and audio data, an LED 70A or a buzzer 70B for generating a predetermined alarm and a generator 70C for generating a symbol signal or a character signal.

When the CPU 4 of the AV center 100 confirms the path of the AV signal line, in step S31, the CPU 4 outputs a present command to the MDP 70 (address is 130H). Having received the present command from the CPU 4, the MDP 70 executes the processing shown in a flowchart of FIG. 54.

Figure 55:
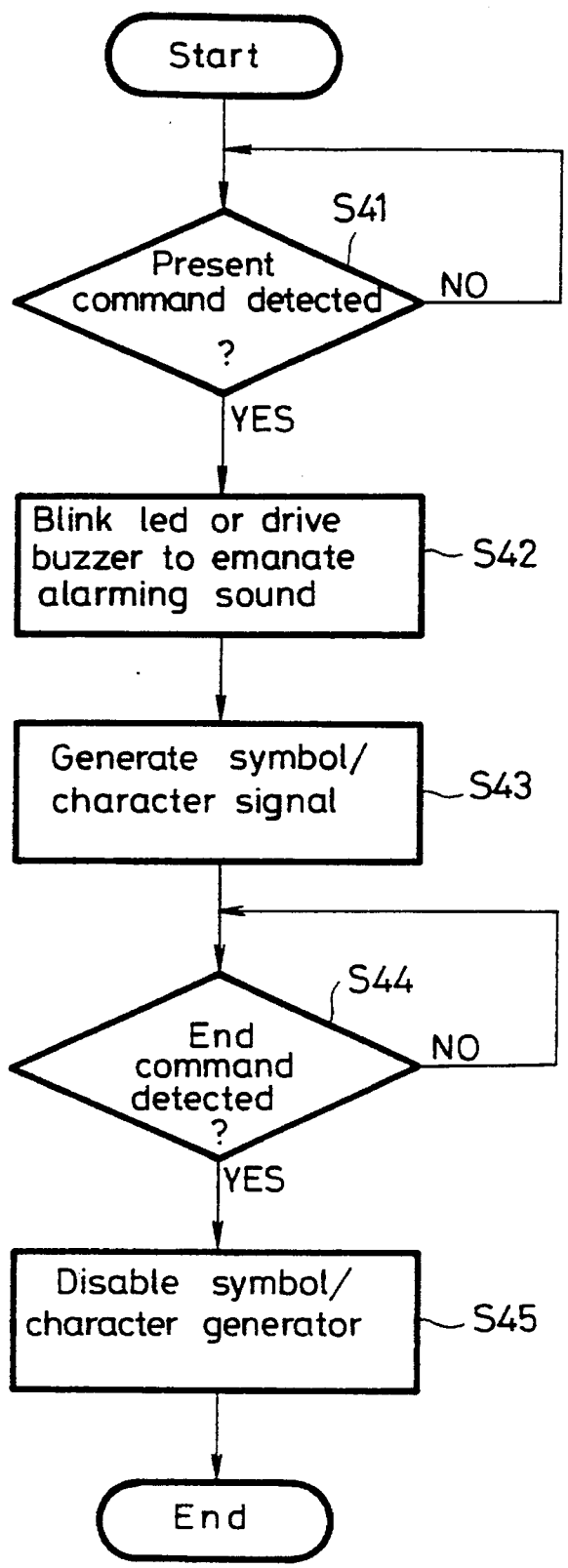
FIG. 55 is a flowchart to which reference will be made in explaining a processing executed when the connected states are confirmed.

Referring to FIG. 55, the MDP 70 is set in the standby mode until it receives the present command generated from the CPU 4 in step S41. If it is determined in decision step whether or not the present command is detected. If a present command is detected as represented by a YES at decision step S41, then the processing proceeds to step S42, whereat the CPU 70D of the MDP 70 causes the LED 70A to blink or drives the buzzer 70B to emanate a predetermined alarming sound. Thus, it is possible for the user to confirm that the signal path confirmation command is input to the MDP 70 from the AV center 100.

At that time, in the next step S43, the CPU 70D drives the generator 70C to generated a symbol or character (e.g., MDP) signal so that the user can recognize the MDP 70. This data is supplied through the AV signal line 71 to the VTR 40, and further supplied from the VTR 40 through the AV signal line 41 to the CRT 13 from the plug P2 of the AV center 100 through the selector 18, thereby being displayed on the picture screen of the CRT 13. Thus, the character, "MDP" is displayed on the picture screen of the CRT 13. Consequently, the user can confirm that the AV signal line is correctly connected such that the output signal of the MDP 70 can correctly be supplied to the AV center 100.

Figure 54:
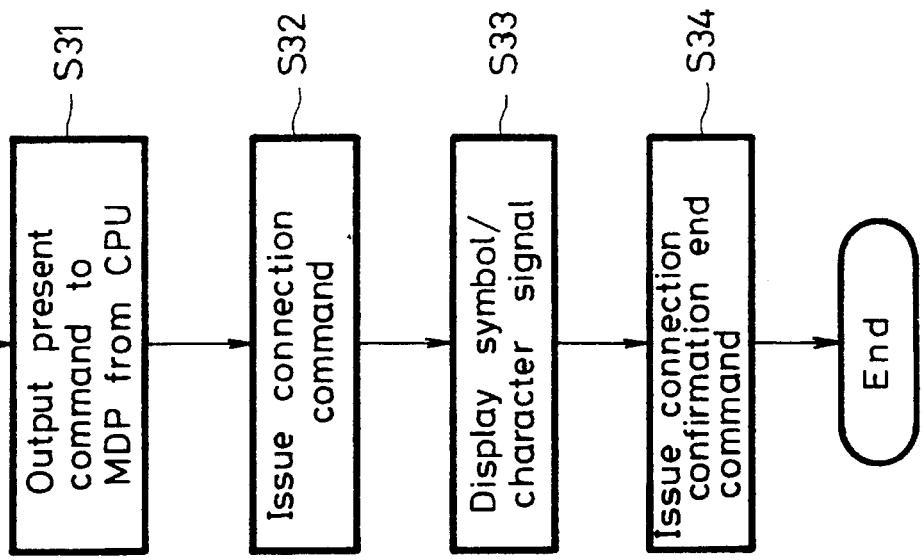
FIG. 54 is a flowchart to which reference will be made in explaining a processing executed when the connected states are confirmed.

Specifically, the CPU 4 of the AV center 100 outputs the present command at step S31 shown in FIG. 54 and proceeds to step S32, whereat the CPU 4 issues a connection command to the VTR 40 to maintain the internal AV signal line so that the signal output from the MDP 70 is supplied to the AV center 100. In the next step S33, the VTR 40 effects the internal connection in response to the connection command supplied thereto so that the video signal (signal in which the character MDP is superimposed on the OSD superimposed on the video signal) output from the MDP 70 is output to and displayed by the CRT 13 of the AV center 100.

Alternatively, if the signal output from the MDP 70 is converted into a signal that can be detected by the CPU 4, then it is possible for the CPU 4 to automatically detect such signal.

The processing proceeds to the next step S34, whereat the CPU 4 issues a connection confirmation end command to the MDP 70.

The MDP 70 generates the video signal in step S43 shown in FIG. 55, and proceeds to the next decision step S44, wherein the MDP 70 is set in the standby mode until the end command is supplied thereto from the CPU 4 of the AV center 100. If the end command is detected as represented by a YES at decision step S44, then the processing proceeds to step S45, whereat the symbol/character generator is disabled. Then, the processing is ended.

The video signal can be displayed in PIP or P-OUT-P in the AV center 100.

As described above, according to the AV system control method of the present invention, since information indicating whether or not the AV equipment included in the standard pattern is used in the AV system in actual practice is memorized and the respective AV equipments are controlled in accordance with such use information, it becomes possible to reduce the number of previously-prepared standard patterns. As a consequence, the memory capacity can be reduced and the AV system can be made inexpensive.

According to the AV system control method of the present invention, since information indicating whether or not the connected states of the AV equipments included in the standard pattern are realized in actual practice is memorized and the respective AV equipments are controlled in response to the information representing the connected states, it becomes possible to manage many connected states by less standard patterns.

According to the AV system control method of the present invention, since the AV equipments that are used in actual practice and the AV equipments that not used in actual practice can be displayed so as to be discriminated when the standard pattern is displayed, it becomes possible to confirm the system arrangement with ease. Therefore, when new AV equipments are added to the AV system, the AV system can cope with such new added AV equipments rapidly.

According to the AV system control method of the present invention, since designated names of the AV equipments are displayed if the names of the AV equipments are designated when the standard pattern is displayed, the user can be prevented from mistaking the AV equipment from a plurality of AV equipments with the same function.

Further, according to the AV system control method of the present invention, since the desired connection line of connection lines of the AV equipments forming the standard pattern can be discriminated from other connection lines, the connected states can be recognized rapidly and reliably. Thus, it becomes possible to avoid an erroneous connection.

Furthermore, according to the AV system control method of the present invention, since an output corresponding to a signal input between the first and second AV equipments is generated, it becomes possible to reliably confirm the connected states.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A method for controlling an audio-video system having an audio-video center and a plurality of audio-video devices, said method comprising the steps of:

storing information in said audio-video center representative of a plurality of predetermined connection states each respectively representing a standard connection pattern between said audio-video center and said audio-video devices;

selecting a group of desired audio-video devices from among said plurality of audio-video devices;

selecting one of said predetermined connection states representing a respective connection pattern;

determining whether any of the audio-video devices utilized in the selected connection pattern are not included in the selected group of desired audio-video devices so as to obtain non-use audio-video devices;

inserting information representative of said non-use audio-video devices into the selected connection pattern information so as to form control information; and controlling said group of desired audio-video devices in accordance with said control information.

2. The method according to claim 1, wherein said standard pattern is a high-order connection configuration including a plurality of connection configurations of said audio-video center and said audio-video devices.

3. The method according to claim 1, wherein when said standard pattern is displayed on a display, said audio-video devices that are used in actual practice are displayed on said display and said audio-video devices that are inhibited in use are displayed at the position in which said audio-video devices should be displayed such that said audio-video devices can be discriminated from audio-video devices that are used in actual practice.

4. The method according to claim 1, further comprising the step of displaying a specific name of said audio-video device on a display when said specific name of said audio-video device that is used in actual practice is designated by the user and said standard pattern is displayed on said display.

5. The method according to claim 4, wherein general names are displayed on said display with respect to audio-video devices that are not designated by the user.

6. The method according to claim 1, further comprising the steps of displaying a connection line representing the connected state of said audio-video center and said audio-video device together with said audio video device so that a connection line receiving an attention can be distinguished from other connection lines when said standard pattern is displayed on a display.

7. The method according to claim 1, further comprising the steps of outputting a first signal to said audio-video center and an object audio-video device that is to be confirmed as a connection object from said audio-video center of a plurality of audio-video devices, outputting a second signal from said object audio-video device to said audio-video center and generating a second output corresponding to said second signal in said audio-video center.

8. The method according to claim 7, wherein said first signal is a confirmation signal to confirm a connection path, and said first output is a predetermined alarm output representing that said target AV device received said confirmation signal supplied thereto from said AV center.

9. The method according to claim 8, wherein said second signal is a signal which causes the user to recognize which AV device is to be connected, and said second output is a display output to display said user recognizing signal on a display of said AV center.

10. A method for controlling an audio-video system having an audio-video center and a plurality of audio-video devices, said method comprising the steps of:

storing information in said audio-video center representative of a plurality of predetermined connection states each respectively representing a standard connection pattern having connection paths between said audio-video center and said audio-video devices;

selecting a group of audio-video devices having desired connection paths therebetween from among said plurality of audio-video devices;

selecting one of said predetermined connection states representing a respective connection pattern having respective connection paths;

determining whether any of the connection paths in the selected connection pattern are not utilized by the selected group of audio-video devices so as to obtain non-use path information;

inserting said non-use path information into the selected connection pattern information so as to form control information; and controlling said group of desired audio-video devices in accordance with said control information.

* * * * *